United States Patent [19]

Ramsey et al.

[11] 4,258,425
[45] Mar. 24, 1981

[54] SELF-PROGRAMMED MECHANICAL WORKING APPARATUS

[75] Inventors: Paul W. Ramsey, Milwaukee; John G. Bollinger, Madison, both of Wis.

[73] Assignee: A. O. Smith Corporation, Milwaukee, Wis.

[21] Appl. No.: 18,662

[22] Filed: Mar. 8, 1979

[51] Int. Cl.³ .............................................. G05B 19/42
[52] U.S. Cl. ................................. 364/513; 219/124.34; 318/568; 364/477
[58] Field of Search ............... 364/120, 474, 477, 107, 364/513; 318/568, 573, 576, 578; 219/124.33, 124.34; 228/7, 8

[56] References Cited

U.S. PATENT DOCUMENTS

| | | | |
|---|---|---|---|
| 3,548,173 | 12/1970 | Pascoe et al. | 318/578 X |
| 3,857,025 | 12/1974 | English et al. | 318/568 X |
| 3,909,600 | 9/1975 | Hohn | 364/513 |
| 3,943,343 | 3/1976 | Irie | 219/124.34 X |
| 4,086,522 | 4/1978 | Engelberger et al. | 318/568 |
| 4,115,684 | 9/1978 | Lindbom | 219/124.34 X |
| 4,150,326 | 4/1979 | Engelberger et al. | 318/568 X |

*Primary Examiner*—Joseph F. Ruggiero
*Attorney, Agent, or Firm*—Andrus, Sceales, Starke & Sawall

[57] ABSTRACT

This invention relates to controlled apparatus having a tool including a plurality of directions of movements with the directions interrelated, such as an arc welding unit having an electrode for contouring of similar work parts along a seam contour. The apparatus includes a logic system and memory such as a computer and a tracer to follow an original contoured curve or shape in space and generate a position-related signal. The computer includes a self-programming program in memory in which control program particulars of a contour are generated and introduced by an initial movement of the tracer over an original contour under a closed-loop position control program in a trace-record mode. During the trace-record mode the computer reads the necessary inputs and creates a set of data at points along the contour. The data sets are fitted together by a spline function (third-degree polynominal) to produce a close approximation of the weld seam in its multi-dimensions. Thereafter, such self-generated control program, in the absence of the tracer, directly moves the tool to reproduce the same contour for welding a part. The trace-record mode may be at a slow feed other than playback speed and the computer may complete data reduction and storage for each point. Various other modes of operation such as manual mode, a set-up mode, a test mode may also be provided. In the playback mode, the tracer may be used to detect out of tolerance parts.

29 Claims, 8 Drawing Figures

SELF-PROGRAMMED MECHANICAL WORKING APPARATUS

BACKGROUND OF THE INVENTION

This invention relates to an automated contouring apparatus for sequential contouring each component in a group of similar related components as well as being conveniently adapted to contouring different groupings of components, and particularly to high speed welding apparatus for sequential welding of a group of components each having a similar weld line.

In mass production of parts, a tool element is often required to move over each component or assembly in some particular pattern or path. For example, welded parts may require a contoured weld seam having a shape or contour which is different for each part. Automated welding devices for mass production of each such part have been suggested. A particularly novel system and apparatus is developed in U.S. Pat. No. 3,452,180, which issued to John G. Bollinger et al, June 24, 1969 and related U.S. Pat. No. 3,530,273, which issued Sept. 22, 1970; 3,542,996, which issued Nov. 24, 1970 and 3,568,029, which issued Mar. 2, 1971. As more fully disclosed therein, the welding head is mounted for movement over the welding path and the electrode is oriented for respect to five different axes, including the three Cartesian coordinate axes, X, Y and Z, as well as angular orientations about a horizontal axis and a vertical axis. A further refinement in the apparatus is discussed in a thesis paper filed in the library of the University of Wisconsin, Madison, Wis., and prepared by Neil A. Duffie et al, as a part of advanced studies under the direction of J. G. Bollinger. The five axis control system, disclosed in the above patents, generally employs a probe unit coupled to the weld head to track the weld seam of each part and provide analog position signals to a control means for establishing the proper movement and orientation of the welding head along the five different axis and thereby maintain optimum location of a welding electrode along the seam. As disclosed in the aforementioned thesis, a computer program can be written which is used to control the welding head.

Although such prior art developments produce satisfactory welded products, the system is relatively complex and expensive and fall short of the present invention in providing flexibility and performance.

SUMMARY OF THE INVENTION

This invention relates to an automated forming tooling apparatus controlling the movement of a tool means for sequentially contouring groups of similar components or parts and having means to record and subsequently control the tool path for forming of different parts. In accordance with the present invention, the forming apparatus includes tracer means and a logic means with a data memory section such as a computer means which initially is pre-programmed with only a start-finish definition of the tool movement, and with a special selfprogramming program in which particulars of the desired movement between the start-finish are generated and introduced into a control memory by operating of the apparatus in an initial trace-record mode of operation of the apparatus. In the trace-record mode, the output of a tracer means such as a probe or sensor coupled to the tool path is employed by the computer means. As the tracer means moves over the original contour or a geometric shape of the path in space, the output of the tracer means provides a feedback signal to cause the tracer means to follow the original contour and simultaneously to create the necessary program particulars in a control program of the computer for subsequent recreating and reproducing such geometric shape or curve by the tool movement in the absence of the tracer means, when placed in an operating mode, for the sequential forming of similar component parts in a group. The present invention has been particularly applied to and provides a unique computer-based controlled automatic seam welder for controlling of the orientation of the welding electrode with respect to the weld seam as it is rapidly moved over the welding seam, and is therefore described as applied thereto for clarity of explanation. The invention may of course be applied to other tooling apparatus such as a generalized mechanical robot to provide a general motion control with a self-teaching and control recording capability, as more fully described herein. Generally in accordance with a preferred construction of the present invention, the apparatus is constructed with a basic motion control program including a start position or location for the tool and from which it moves under a program to a start location, a seam trace program during which the tracer means output, and related tool position generated signals, are employed by the computer to control the movement along the contour or seam and simultaneously to provide coordinate information to the computer which generates the particular detailed control program for driving of the electrode over such path. The basic control program then moves the electrode back to the start position, preferably by straight line movements to a retracted position and then back to the start position. The motion from the start of the weld seam to the end of the weld seam is thus under a probe-responsive position control and program-definition generation program while the movement to the start of the weld seam and from the end of the weld seam are manually or otherwise written into the basic program. The path along the welding seam, which may form practically any geometric shape or curve in space within the work area of the apparatus, is thus determined by the trace input mode of operation with self-program definition and writing provided by the computer to provide the self-programming of the computer.

In a preferred and particularly unique construction, during the trace-record mode, the computer automatically provides reading of coordinate information at appropriately spaced locations or points along the seam to provide a set of data for that point. Each set of data at successive points is employed to define the total seam path by fitting of such points together. The points are preferably fitted by a series of cubic spline functions (third-degree polynominal) which provide a close approximation of the weld seam in its three dimension. The computer may be programmed to determine the number of points along the seam at which the data is read. If there is any portion in the weld path when welding should not be provided, the appropriate program data is separately placed in the program. The computer in the trace mode thus drives the apparatus with the probe signal as the input and with continuous monitoring and moving the probe into the seam under a closed loop position control to maintain the probe in contact with the seam. During this cycle, at each reading point, the computer automatically reads the position, and slope, and converts the information necessary to properly locate the electrode at that point and stores such information in its control program. The speed during the trace-record mode is preferably a relatively slow feed, permitting ample time for the computer means to complete all the calculation and store the necessary information as well as provide accurate tracing. However the speed selected is a function of the operator or programmer.

The computer preferably incorporates a proportional plus integral control to minimize errors at high rates as the device moves around the corners and the like. However, the system may be constructed to use the principle of feed-forward control compensation or any other suitable type of error-minimizing control.

The computer controlled tracking and control apparatus for the tool means may also include various other modes of operation such as a manual control, a set-up mode, a test mode, but in any event includes both a trace-record mode during which the system does not operate on the part but only records the movement of the tracer means over the original contoured means under a computer position control and recording program and an operating or playback mode during which the program so formed and recorded is subsequently employed to directly position the welding electrode or other tool for high speed contouring operations.

The apparatus may also include a maximum error detection during the actual playback or operating mode as a further safety feature. Also, a probe unit output may be employed during the operating mode to detect out of tolerance parts. However, use of the probe in the playback mode is optional and would generally not be employed simultaneously with the functional tooling.

Thus, "contour" and "contouring" are employed herein to generically define any physical geometric shape or curve in or on a work component or part and existing in space which can be sensed and followed by a tracer means. The present invention thus provides a high speed contouring apparatus or the like with the self-programming providing a highly effective means of closely fitting the control program to an actual traced contour to permit the accurate response to relatively small changes in the contour. As a result the necessity for use of skilled programmers and the like is avoided. Further, the weld seam or other contour should be more accurately determined and the necessity for subsequent manual processing of the contoured products or the like will be essentially minimized if not eliminated.

BRIEF DESCRIPTION OF THE DRAWINGS

The drawings furnished herewith illustrate a preferred construction of the present invention in which the above advantages and features are clearly disclosed as well as others which will be readily understood from the following description thereof.

In the drawings.

DESCRIPTION OF THE ILLUSTRATED EMBODIMENT

Figure 1:
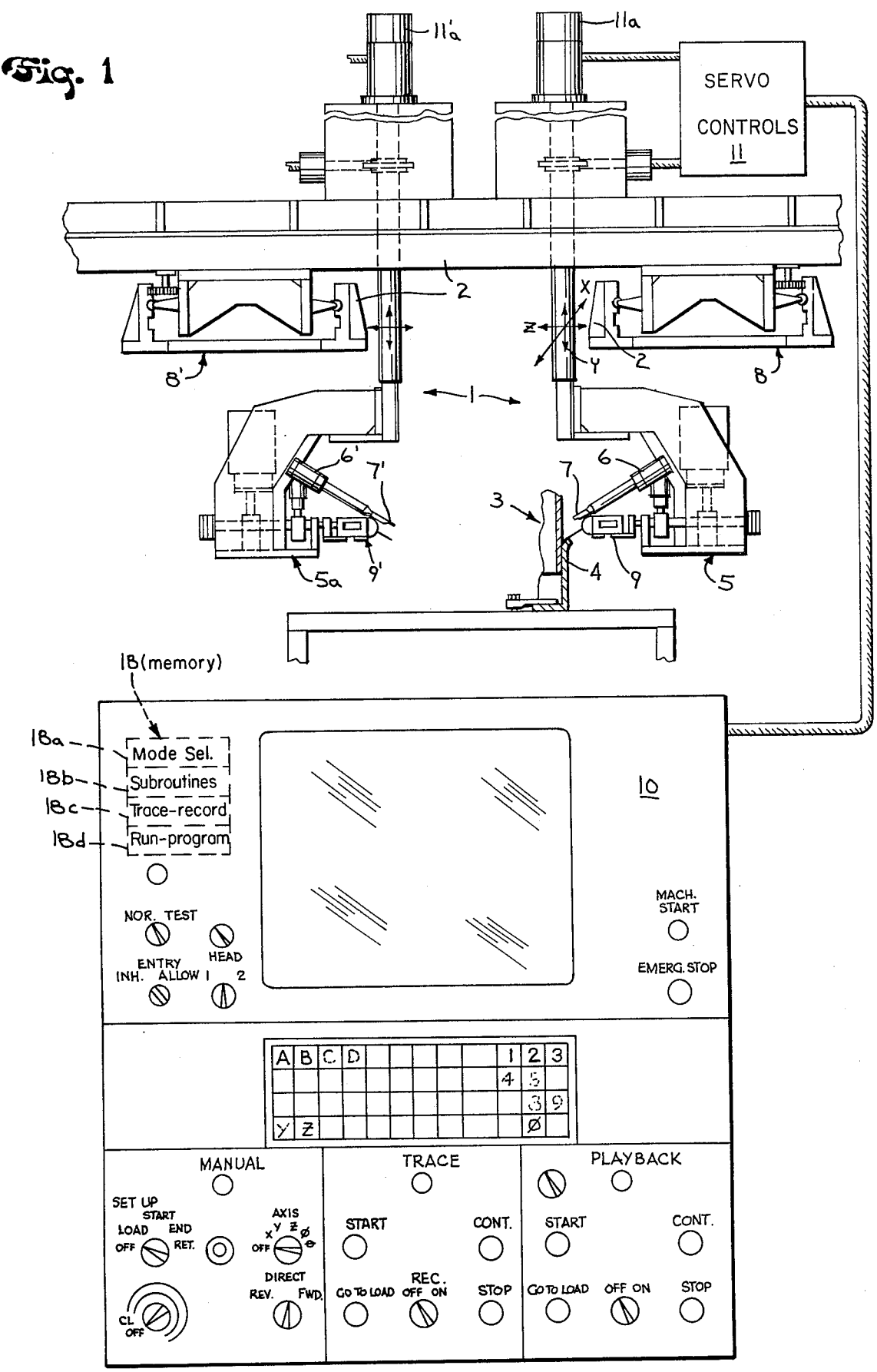
FIG. 1 is a diagrammatic illustration of a 5-axis dual head seam welder constructed in accordance with the present invention.
Figure 2:
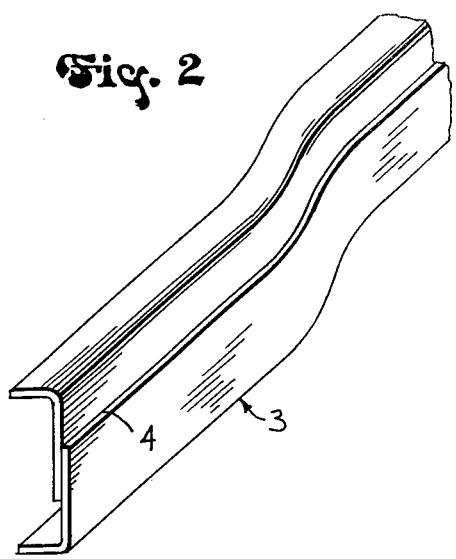
FIG. 2 is a pictorial view of a product having a weld seam to be automatically traced and welded in the apparatus.

Referring to the drawings and particularly to FIG. 1, the present invention is shown applied to a dual-head, 5 axis seam welding apparatus 1 having a supporting frame structure 2 within which a work unit 3 is releasably supported. Unit 3 is shown including a pair of metal frame elongated members each having a generally L-shaped cross-position and partially telescoped together to define a weld seam 4. The unit 3 diagrammatically illustrates an automotive frame part. A pair of weld heads 5 and 5a are movably supported within structure 2 and adapted to move along the weld seam 4 which defines a geometric curve in the work space of the apparatus for welding along the seam. Each weld head 5 and 5a is similarly constructed to the opposite side of the structure from the other weld head. The heads are manipulated in generally staggered relation to permit movement through the apparatus for welding a part located in the path of the opposite head. Head 5 is referred to during the following description and corresponding elements of head 5a are identified by corresponding primed numbers. Each head includes an electrode holder 6 for supporting an electrode 7 with means for moving and orienting of the electrode 7 relative to five coordinates in a cartesian coordinates frame, generally in accordance with the positioning systems disclosed in the Bollinger et al patents. The head 5 moves along the frame on the track 8, and thus generally along the seam 4, which direction is identified for purposes of explanation as the X-coordinate. The head moves vertically along a Y-coordinate and laterally across the frame structure 2 and the work 3, along a Z-coordinate. In addition, the head is adapted to rotate about the vertical or Y-axis and about the X-axis for proper angular orientation of the electrode in the horizontal and vertical planes with respect to the seam.

A transducer and probe unit 9 is shown mounted on the head 5 touching the object seam at null at the intersection of the X, Y and Z-axis. In actual practice, a special head may be employed with the probe located in the position of the electrode and a separate quick disconnect welding head employed for the welding. The probe unit 9 is a D.C.D.T. position transducer including a probe adapted to trace or follow the weld seam and provide a differential D.C. signal, one for each of the Y-axis and Z-axis, as more fully described in the previous U.S. Pat No. 3,530,273 to Bollinger et al. The output signals therein are employed with other appropriate signals for operating of separate drive means for moving of the weld head along the X-axis with constant horizontal reference velocity and positioning the electrode holder in each of the other four axes. The weld head structure preferably corresponds to a 5-axis seam welder, as disclosed in the previously identified prior art, with the addition of the second head for increasing the capability and capacity of the apparatus. Reference may be made to such art for particulars of the head structure and drive motor connections and no further description is therefore given of the particulars of the head structure other than is necessary to more fully describe the concepts and structures of the present invention.

Generally, in accordance with the present invention, the output of probe unit 9 is connected as an input signal to a computer 10. The output of the computer 10 is coupled to a positioning control apparatus 11 for controlling of the location of the electrode relative to the seam 4. Apparatus 11 as previously noted includes a separate drive signal for each head axis, which is derived from the computer. As more fully developed hereinafter, the computer 10 is programmed for a plurality of a different operating modes, which includes at least two modes: (1) a trace-record mode during which the computer 10 reads the probe output and generates the required five motions, and records the particulars of the seam 4 and (2) a welding mode during which the computer directly reads such self-generated program to directly and correspondingly move the weld head and electrode along such path. Generally, a set-up mode is also provided permitting the operator to program the machine in accordance with different basic sequences between weld start-of-seam and the end-of-seam positions for the particular work unit 3.

In the trace-record mode, the computer 10 continuously monitors the output of the probe 9 and drives the head to maintain the probe in proper engagement and orientation with the seam with respect to each of the plurality of different axes. Simultaneously, the computer 10 reads the output of the axes position transducers 11a at selected points of the movement over seam 4 and records the necessary data in computer language for forming and storing a control program which defines the seam contour for use during a subsequent playback mode. During the latter playback mode, the weld head 5 and electrode 7 is moved directly under closed-loop computer servo control along such program defined seam curve of all five axes for automatic welding of the component parts 3 mounted within the welding apparatus.

The probe unit 9 can be removed or retracted so as to be spaced from the seam during the operating modes as hereinafter discussed or separate trace and weld heads can be used. In this manner, the apparatus is capable of automatic welding of successive similar units 3 directly under high speed computer control without the necessity for the usual probe feedback system or controls.

In practice, the apparatus will include various other modes for monitoring machine operation and adapting the machine to different work units. For example, the apparatus preferably includes the manual mode in which each axis of each head is manipulated under operator control. A test mode under which the device can be operated between selected points without welding or recording to monitor the performance of each head along each axis.

Figure 3:
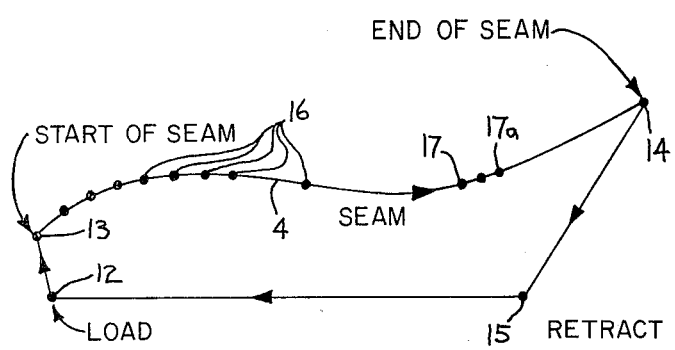
FIG. 3 is a diagrammatic illustration of the movement of the weld head and particularly the welding electrode in developing of a welding component such as shown in FIG. 2.

More particularly, a welding machine cycle may be, for example, as shown in FIG. 3, in which the electrode moves from a programmed reference position removed from the work part and defined as a load point 12. The electrode 7 is moved from the load point 12 to the start location of the weld seam 13 under a computer defined spline program, at which time the computer enters into the trace mode, or the playback mode, during which the head moves under a probe responsive control, or a direct computed drive, as subsequently discussed. At the end location 14 of the seam 4, the computer automatically detects such position and removes the head to a retract position 15 and finally back to the load position for a subsequent cycle. The several locations including start and end of seam, and retract locations are points fully specified by the operator under manual control and subsequently automatically with the electrode movement from and to such positions defined by appropriate drive programs in the main computer program. The movement to and from the ends of the weld seam 4 may be a straight line function program, such as given in the previously identified thesis. During the set up mode, the four basic change-over positions or locations 12-15 are defined and manually set up by the operator by manually positioning the machine to the desired location and then instructing the computer to sample the coordinate information via scanning the axes position transducers 11a. The computer automatically develops the necessary A/D conversion to define all axis at each point for the head 5. From the data for the weld start of scan and weld end of scan points 13 and 14, the computer automatically computes the incremental spacing or points 16, at which readings are to be taken under the trace-record mode. If there is any portion or portions within the weld seam 4 which should not be welded such as indicated by points 17 through 17a in FIG. 3, the operator introduces the location information by instructing the computer to store a block of data defining the initiation and termination of each weld portion along the seam.

The apparatus is then operated in the trace-record mode, in which the machine automatically cycles in a closed-loop computer tracing control, from the start-of-scan position to the several data collection positions (13-16-17-14), completing each of the movements under the defined program. The movement between the weld start position 13 and the weld end position 14 is under a probe control program in which the computer 10 drives the head along the weld seam 4 by reading the output of probe unit 9 and moving the head to maintain the probe unit in proper engagement with the seam 4.

More particularly, the illustrated computer 10 which is a basically sophisticated logic control circuit may be any special or general purpose computer and is diagrammatically illustrated in simplified form as such devices are now readily understood with the necessary internal structure to execute the functions based on defined inputs to produce the necessary outputs. The program system is also diagrammatically illustrated in accordance with the requirements of this invention. Thus, the program memory unit 18 is illustrated including a program section 18a in which a plurality of different operating modes are programmed. The computer 10 of course includes the usual means for selection and execution of the appropriate program section in response to the operator selection. Generally, the program memory unit 18 includes a subroutine program section 18b for use in both the trace mode and the playback mode in which the subroutines for moving of the electrode and/or probe from the load location 12 to the start location 13 and from the finish location 14 to the retract location 15 and from the retract location 15 back to the reference location 12. These are straight line spline control segments. The four illustrated positions or locations are manually inserted by the operator manually positioning of the electrode and probe unit 9 relative to an original contoured component or unit 3. The computer 10 then introduces such information in the executable run programs for each subroutine and thus provides for the above described movements.

The program memory unit 18 further includes a trace-record program section 18c and a playback or run operating program section 18d, which respectively provide for operation of the apparatus in the trace-record mode and in the welding or playback mode.

The necessary computer programs for the several modes of operation and the related flow charts are shown in the attached appendix. The progams are written for a PDP 8 E computer, and can be compiled for converting to the computer language. The program is given as a typical example, and other programs for other computers can be readily provided by those skilled in the art based on the present teaching. In addition to the attached which discloses a basic operating system, appropriate mathematics and programs for the various operations other than the self-programming trace mode are also disclosed in the previously identified thesis.

In the trace-record mode, the probe 9 is located in the start position slightly spaced from the weld seam 4. When the machine is activated, the probe 9 moves to null on the weld seam 4 and particularly the start position 13. The computer 10 measures this start position and proceeds under probe control to trace the seam collecting data at and near the knots or points 16 and proceeds to follow the seam 4, recording each knot position and slope at the knot, end positions and the like, for each axis. Each point 16 is related to the previous point 16 and connected to define the weld seam 4 as a three-dimensional continuous path within the machine frame support. The points 16 are advantageously connected by the spline function which can connect points 16 in an accurate reproduction of the weld seam 4. When the electrode 7 reaches the seam end 14, the computer 10 records the end of seam data and transfers all of the point information into the appropriate operating memory and returns to the main program.

The subroutines for movement from the load position 12 to the start of the seam 13, from the end of the seam 14 to the retract position 15 and from the retract position to the load position 12 are employed in both trace and operating modes to complete the cycle.

Under the probe-trace mode and probe-trace-record mode, the probe 9 moves along the seam 4 under computer control, with either a data record or no-record data operation. In either trace-mode, the probe signal is employed by the computer to generate closed-loop position drive signals with appropriate actuation of the drives such that the probe accurately tracks the seam. Thus, in the preferred embodiment, the several drives include appropriate position-related potentiometers and tachometers, the output signals of which are combined with the probe and command signals to develop the several drive signals for the five axes.

Figure 4:
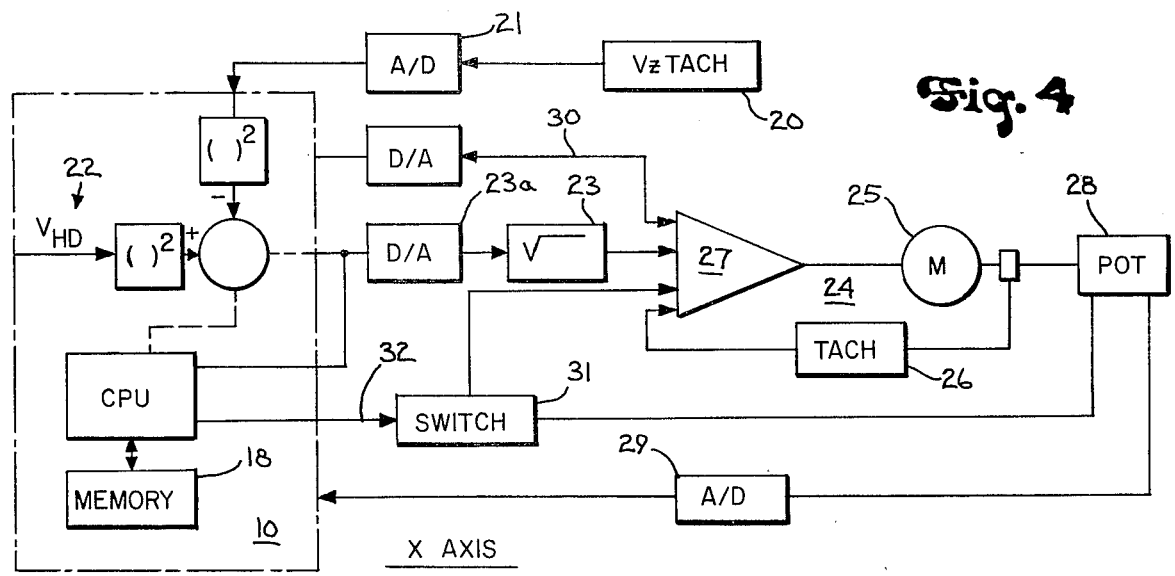
FIG. 4 is a schematic illustration of a closed loop servo control system for establishing a reference velocity drive in a first axis of the cartesian coordinates, identified as the X-axis which extends in the direction of the weld seam.

In this embodiment, the electrode 7 is driven along the direction of the weld, with a preestablished constant reference velocity established as a vector in a horizontal plane. The horizontal reference velocity can be determined and combined mathematically with the Z-axis velocity to develop an appropriate X-axis drive velocity reference signal, as diagrammatically illustrated in FIG. 4. Thus, the Z-axis speed signal from a Z-axis tachometer 20 is converted to an appropriate digital signal by an A/D converter 21 and fed to the computer 10. The desired horizontal reference velocity is also provided as a computer input signal as at 22 during the initial set-up by the operator or programmer. The control could be reorganized to maintain a constant reference vector velocity along the seam contour or any other axes, however the present disclosure is appropriate for some types of welding such as arc welding of frame members. The computer 10 generates the X-axis velocity drive signal as schematically shown in FIG. 4. Thus, the input signals are squared, subtracted and the square root taken to develop a proper output signal. The square root function may be performed within the computer or externally as at 23. The digital computer signal is applied to a D/A converter 23a and thereby converted to an analog signal which is applied as an input reference signal to a speed responsive closed loop drive 24 for the axis drive motor 25. The output of the motor is connected to an X-axis drive tachometer 26 to develop a velocity signal which is compared to the reference signal generated by the logic system provided by computer 10 to the comparator amplifier 27 to develop the necessary signal to energize the X-motor 25 for the proper horizontal speed. A position potentiometer 28 is also coupled to and positioned by motor 25 in accordance with the movement of the tracer probe 9 from the weld start position. The output of the potentiometer is connected to the computer 10 through an A/D unit 29. During the trace-record mode, the output of the potentiometer 28 is recorded for each knot or joint. During playback, the X-axis is driven in a closed position loop based on position command signal from computer 10 via a command signal line 30 to the comparator amplifier 27. A switch unit 31 connects the potentiometer 28 to the amplifier 27. Switch unit 31 closes the feedback loop for playback. The computer 10 is connected to actuate switch 31 and particularly generates a closing signal during playback via a command line 32. During playback, the X-axis drive is solely based on the demand signal from computer 10 applied via line 30, which in turn was generated in the run program during the trace-record mode, and the position feedback signal from the potentiometer 28 via the now closed switch 31. Thus, the motor 25 is energized by the position related command signal to produce the desired movement along the X-axis. The switching function and closed-loop control could be accomplished within the computer where computer speed permits.

The Y- and the Z-axis drive signals are also closed-loop computer controls but with the output of the probe unit 9 providing an appropriate direct current input signal as the basic command. A control system is shown in block diagram in FIG. 5 for the Y-axis. The computer 10 thus samples the output of the probe unit 9 at a predetermined rate and provides a corresponding input to the computer 10, with the appropriate A/D interfacing converter 33. The computer 10 generates a position control signal to the drive network 34 which essentially corresponds to the Y-axis drive error. The Y-axis drive control input system preferably includes a proportional and integral control unit 35 to minimize error at high speed rates of movement along the weld seam 13. This function, when used, may be included in the computer software, or as a separate hardwired unit as shown by block illustration in FIG. 5.

The probe signal is thus processed in the normal manner under an appropriate logic routine and the output signal used to develop an appropriate output signal indicative for the transducer position for the Y-axis. The output is converted in a suitable digital-to-analog converter to provide an analog signal for actuating of the Y-axis drive motor 36 in a closed loop computer based control loop 34. The output of the associated positioning Y-motor 36 is, of course, coupled to the drive to reposition the electrode 7 along the appropriate Y-axis. Thus, during the trace-record mode, the Y-axis probe signal constitutes the basic control signal which is outputted to the comparator amplifier 27 as the positioning control signal. Motor 36 drives the electrode holder such as to position the electrode 7, and simultaneously positions the probe unit 9 to maintain engagement with the seam 4. The output of a Y-axis potentiometer 37 is properly read and stored for each knot or point to define the Y-axis coordinates.

Figure 5:
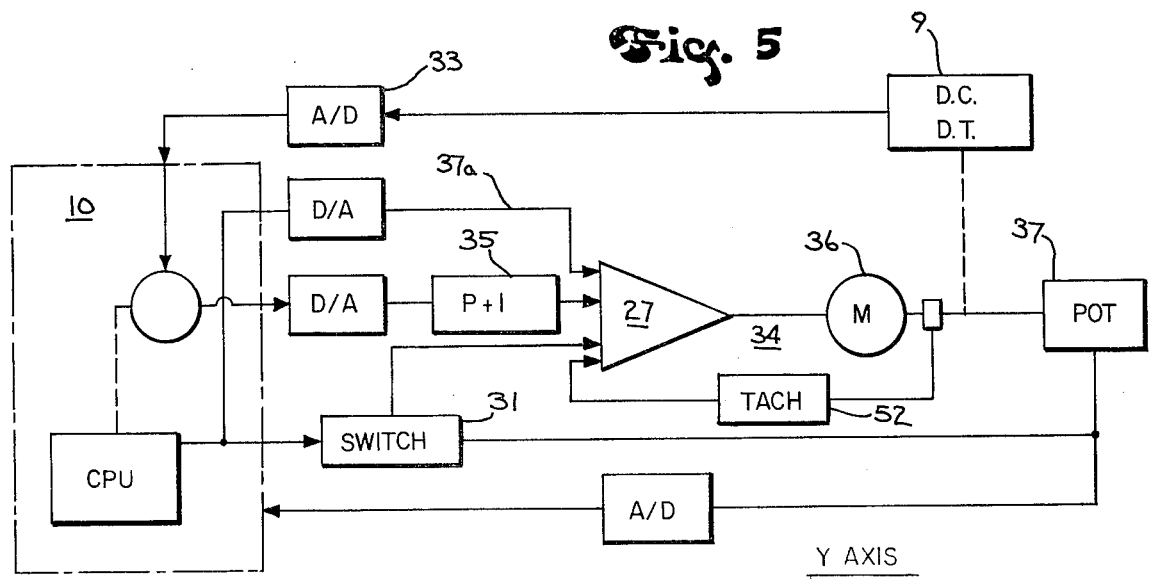
FIG. 5 is a view similar to FIG. 4 illustrating the control for a mutually perpendicular axis to that of the first axis, identified as the Y-axis.

During playback, the computer 10 provides via line 37a the position command signal to the amplifier 27, and the output of the potentiometer 37 is applied via the now-closed switch 31 of FIG. 5 to close the position loop. Closing this position loop through the computer is also optional.

Figure 6:
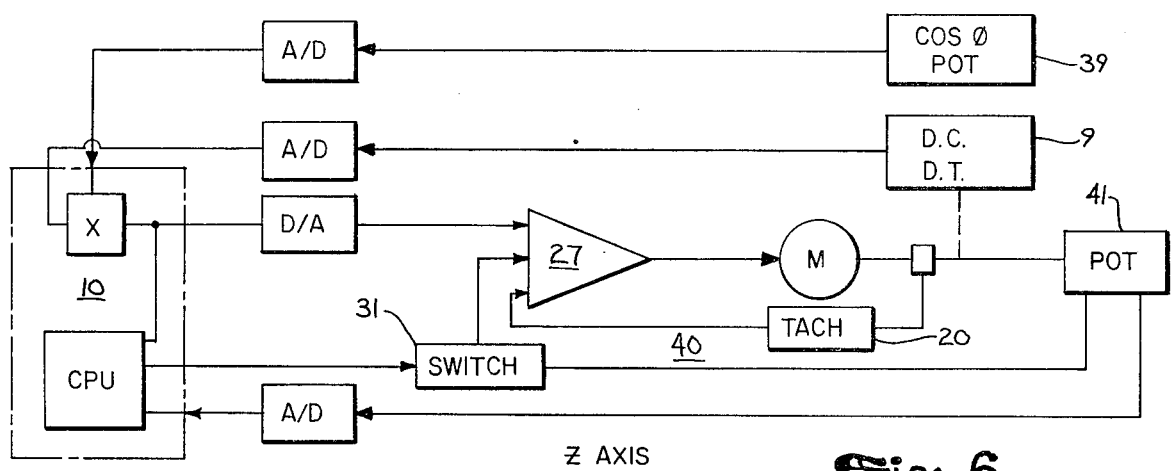
FIG. 6 is a view similar to FIG. 5 illustrating the control for the Z-axis.
Figure 7:
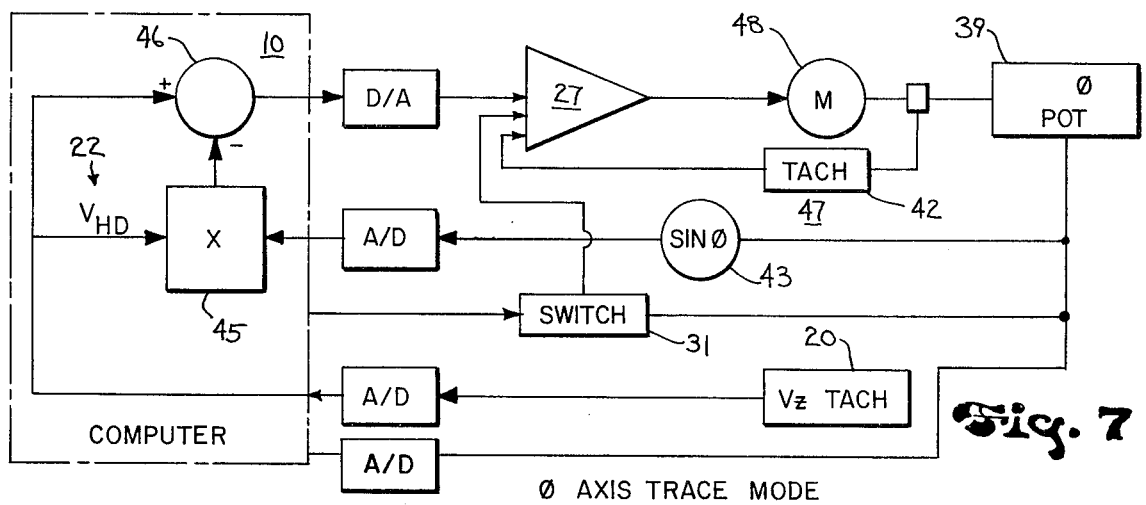
FIG. 7 is a similar illustration of a control system for positioning and angular orientation of the electrode in the horizontal or X—Z plane.

The Z-axis drive system is shown in FIG. 6 and is similar to the Y-axis drive. However, the Z-axis velocity command signal is defined as the product of the probe output signal and the cosine of a $\phi$ angle position signal or $V_z = E_z \cos\phi$. The D.C.D.T. output signal is that related to the Z-axis position and the $\phi$ angle position is derived from a $\phi$-axis potentiometer 39, which is coupled to the $\phi$ axis drive motor as shown in FIG. 7. The angle potentiometer may directly generate the geometric function or the output or a sampled position indicator may be applied to a function generator in the computer. The Z-axis system is otherwise similar to the other systems and in particular provides a closed position loop 40 during playback based on a position potentiometer or other position transducer selectively connected into the network by switch 31 as an option to closed-loop computer.

Figure 8:
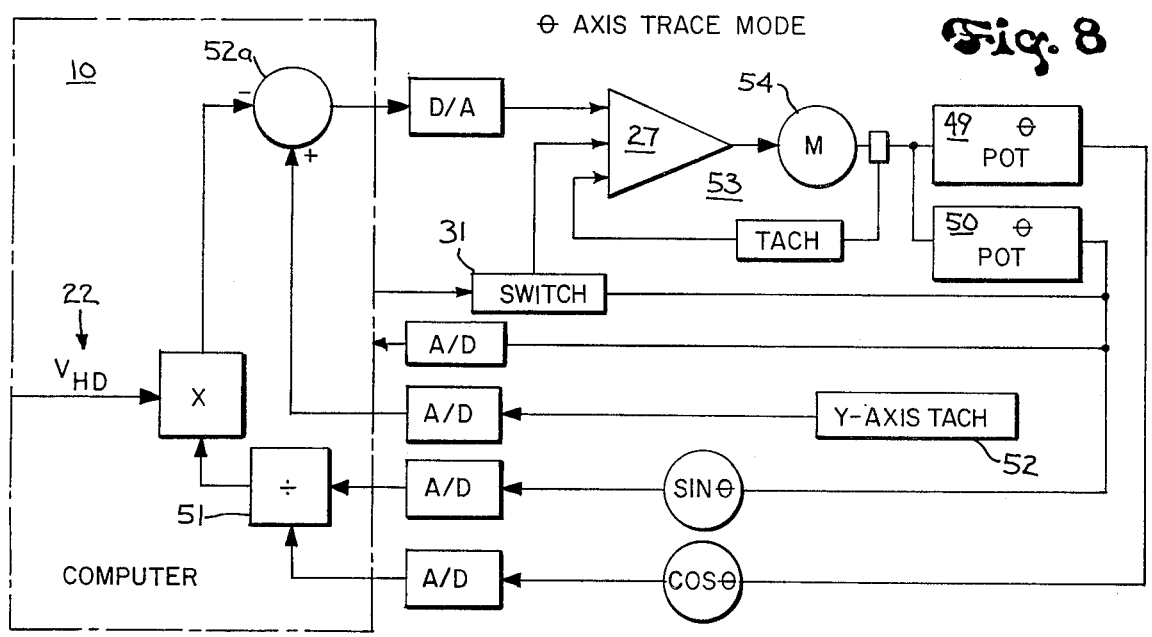
FIG. 8 is a view similar to FIG. 7 illustrating a similar control for angular orientation of the electrode in the vertical or X—Y plane.

The angle position motor controls are also closed-loop position systems, such as shown in FIGS. 7 and 8. The $\phi$ axis error signal is defined by the following equations:

$$e_\phi = V_Y - V_{HD}\sin\phi$$

while the $\theta$-axis error signal is similarly defined by the equation:

$$e_\theta = V_Y - V_{HD}\tan\theta$$

Thus, the computer 10 provides similar control implementation employing the proper velocity signal from the Z-axis and Y-axis tachometers and the appropriate programs to complete the system such as shown in FIG. 7 for the angle $\phi$ and in FIG. 8 for the angle $\theta$. Referring to FIG. 7, the output of the Z-axis tachometer 20 is applied as one signal to computer 10. The base horizontal reference velocity signal $V_{HD}$ is present, as previously noted, and provides the second input. The sine $\phi$ signal is developed by directly using a sine generating potentiometer 39 or employing a conventional potentiometer 39 connected to sine function generator 43 in or exterior to the computer. The product of the sine $\phi$ signal and the operation input signal $V_{HD}$ is generated by the computer 10 as shown at 45 and the output is summed with the converted digital velocity signal $V_Z$ then the output is impressed as an analog command signal on the control input to a closed velocity servo loop 47 for the $\phi$-motor 48. This provides the trace mode. The potentiometer 39 again provides data collection of coordinates through the A/D at each point or knot which is employed for recording and closed-loop computer control of playback or closed-loop control switching by switch 31.

The theta $\theta$-axis drive system is similar to the $\phi$-axis drive system, except that sine $\theta$ and cosine $\theta$ signals are generated through appropriate $\theta$-motor position potentiometers 49 and 50, and the signals employed to mathematically generate the tangent $\theta$ signal as at 51. The Y-axis tachometer 52 is employed to provide a $V_Y$ velocity signal which is summed with the product of the $V_{HD}$ and the tan$\theta$ signal, as at 52a. The output is impressed on the comparator 27 of drive loop 53 for the $\theta$-motor 54.

The $\phi$ and $\theta$ drive systems both include closed-loop motor drive networks 47 and 53 similar to the three coordinates axis drives, and each motor is coupled to an appropriate potentiometer for generating an angle related signal via the control switches 31. Both angle drive systems therefore include the position input connection for the trace-record mode, and the switched position feedback signal loop for the playback mode. Thus, during the playback mode, the computer directly produces a position signal to the comparator amplifier units 27 of the respective drive loops 47 and 53, and the output to the respective motors 48 and 54 are based on the comparison between the command signal and the position feedback signal from the potentiometer.

The present invention thus provides a multiple axis self-programming robotal apparatus particularly adapted for application as highly improved, high speed, self-programming tooling such as can be used in arc welder. The computer driven-trace mode and trace-record-mode to define the robotal path and the subsequent operating mode are completely separate and distinct modes of operation. This permits using a relatively slow tracking and recording of the path to provide highly accurate and precise location of the weld path definition. This information is stored and used to generate a continuous position control signal during playback. The playback mode is then employed with welding head mounted within the apparatus to accurately position the welding electrode 7 along the seam 4 of the work members. The movement is based on the information stored during the trace-record cycle or mode. The work or welding movement is thus under direct computer control to provide a very high speed drive of the welding machine.

A probe unit 9 may be used to monitor the presence of the seam thereby permitting analysis of deviation of a seam from part to part in production. Thus, diagnostic programs can be used in the playback mode, wherein the output of the probe unit 9 is then coupled to a monitoring device to continuously sense the presence of the seam. A monitor program in the computer employs this signal to incorporate an analysis of seam geometry.

Further to this invention is the possibility of having the computer monitor all feedback signals and regularly perform a fault check to assure that all axis of all heads in all operating modes are performing within specified error tolerances and to provide a safety shut-down if error tolerances are exceeded.

Various modes of carrying out the invention are contemplated as being within the scope of the following invention particularly pointing out and distinctly claiming the subject matter which is regarded as the invention.

RAMSEY ET AL

SELF-PROGRAMMED MECHANICAL WORKING APPARATUS

Executed March 5, 1979

APPENDIX

SETUP MODE . . . . . . . . . . . . . . . . I

TRACE-RECORD MODE . . . . . . . . . . . . II

PLAYBACK MODE . . . . . . . . . . . . . . III

TRACE CONTROLLER . . . . . . . . . . . . . IV

COMPUTER PROGRAM FOR THE
   PDP 8/E SELF PROGRAMMING . . . . . . . V

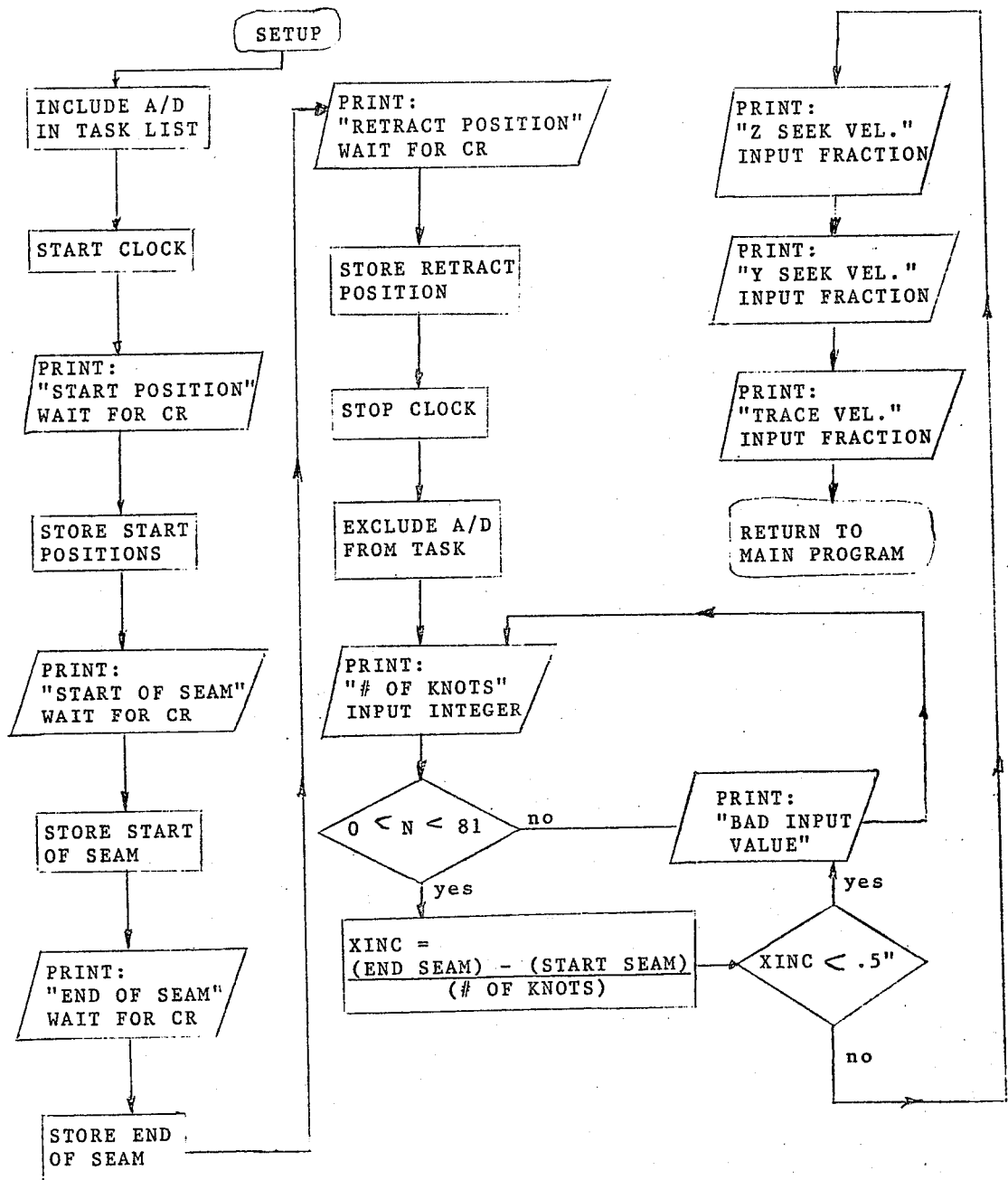

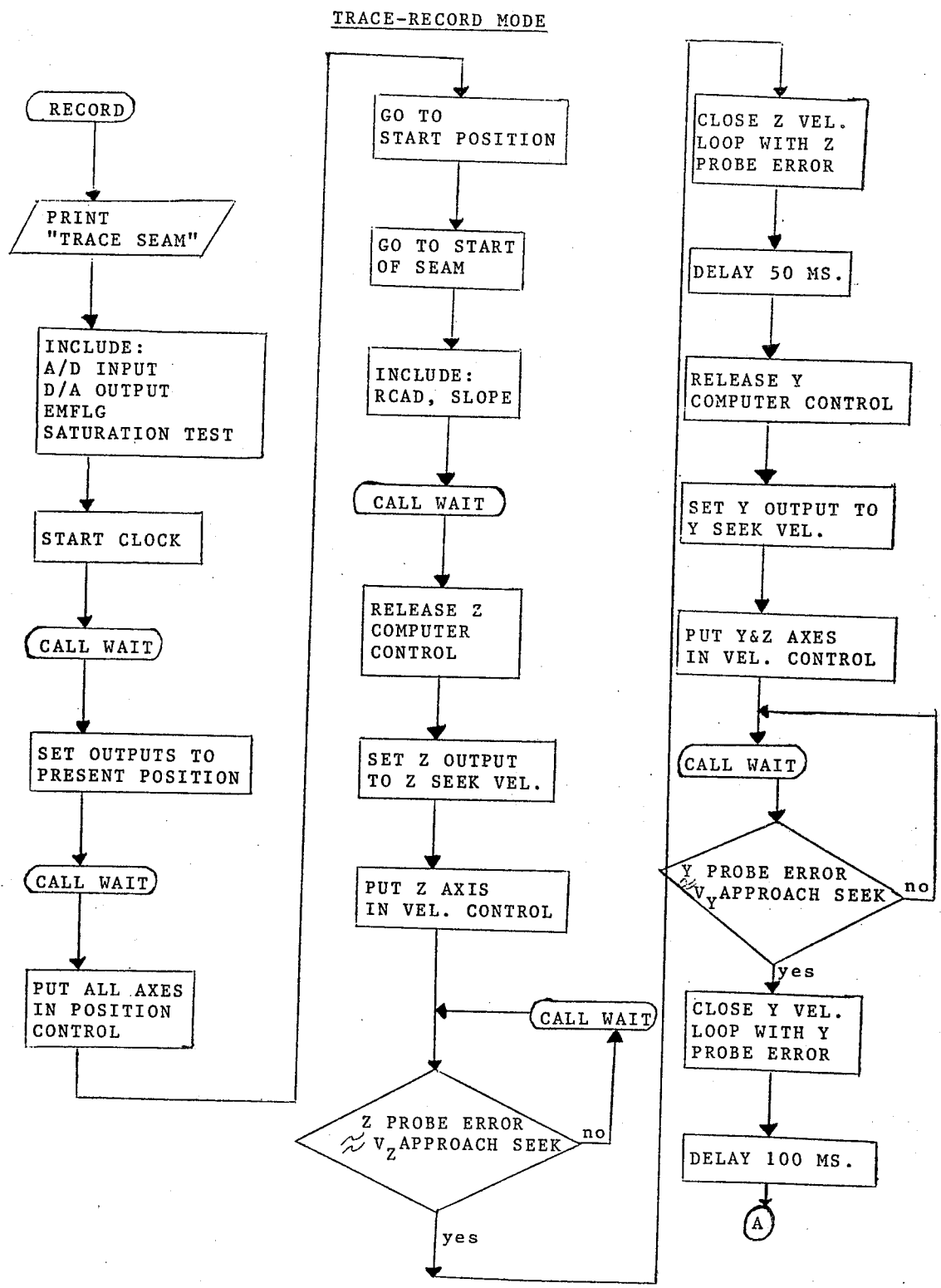

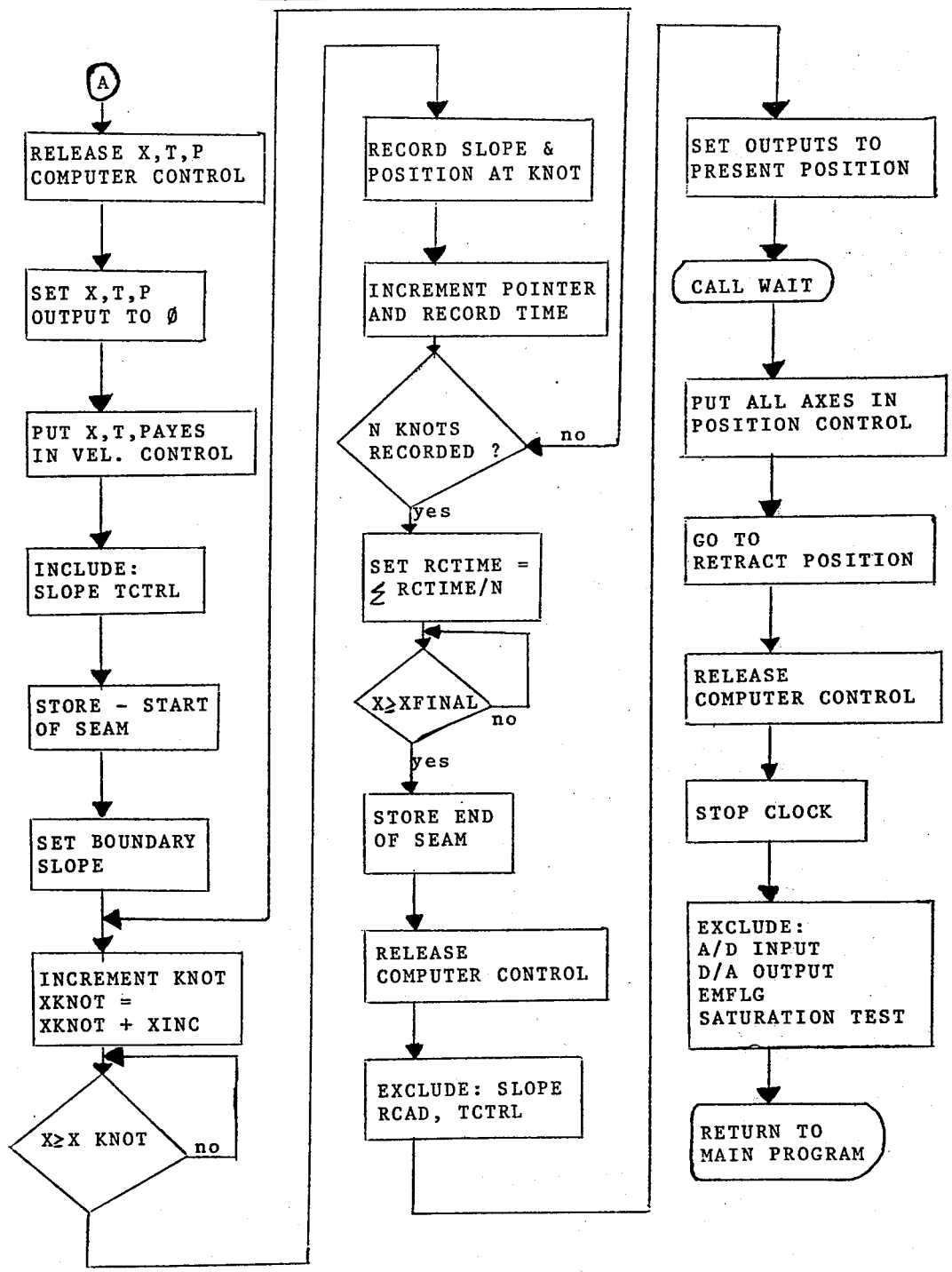
TRACE-RECORD MODE - CONTINUED

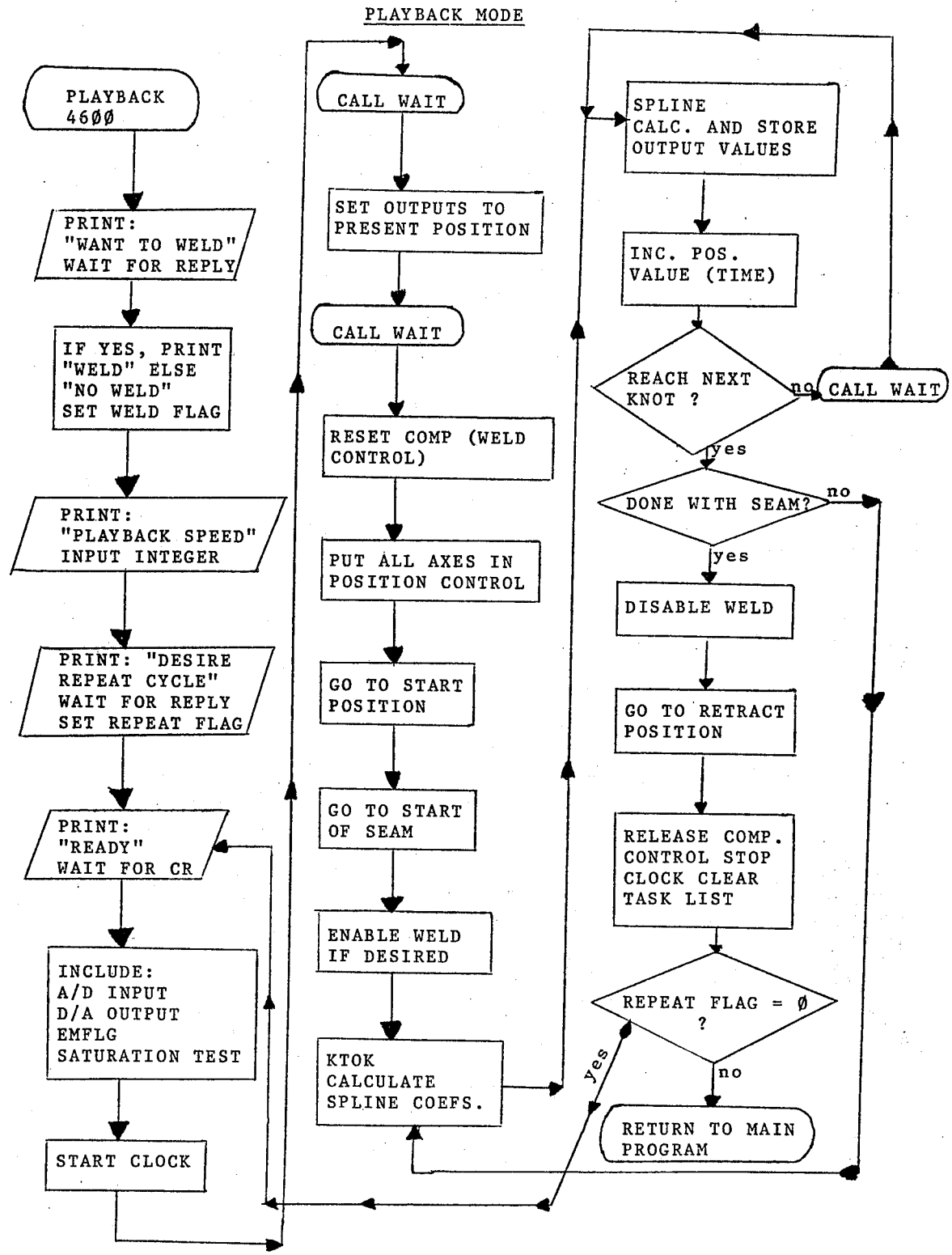

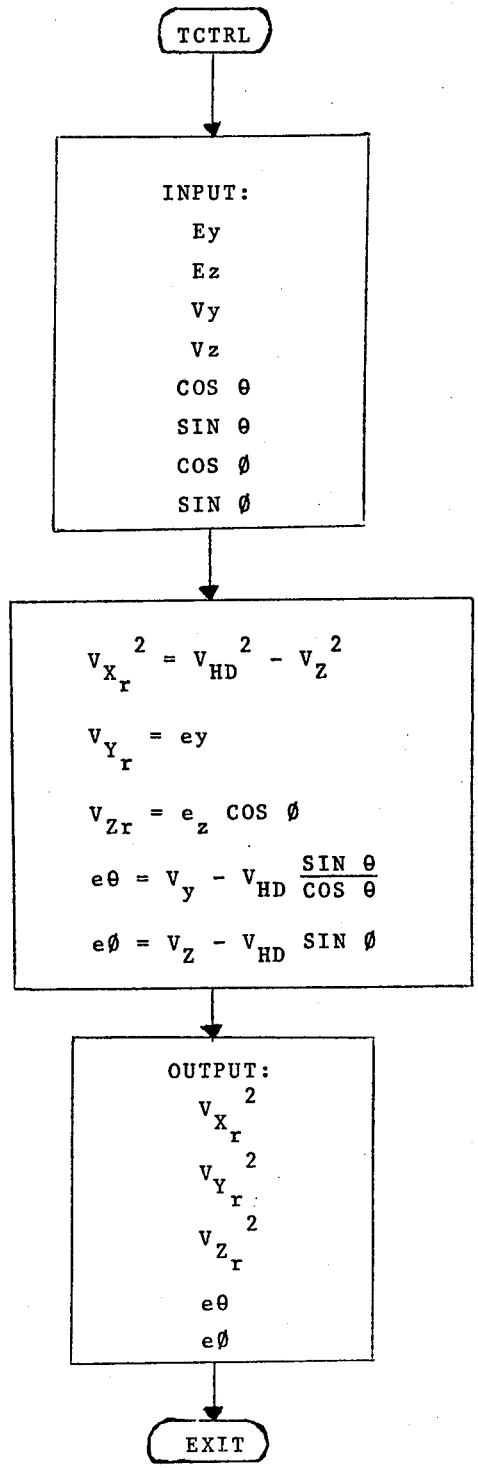

A COMPUTER PROGRAM FOR
THE PDP 8/E SELF PROGRAMMING
FIVE-AXIS SEAM TRACKER

Definitions

```
/INTERNAL
CAF=6007
GTF=6004
RTF=6005
/
/CLOCK
CLAB=6133
CLDE=6132
CLSA=5135
CLSK=6131
CLZE=6130
/
/AC=MQ
RSW=7002
ACL=7701
CAM=7621
MQA=7501
MQL=7421
SWP=7521
/
/INTERFACE INST DEFINITION
ADCIN=6561
ADCONV=6590

SKADC=6562
DACX=6500
DACY=6501
DACZ=6502
DACT=6503
DACP=6504
SELECT=6505
SELCTL=6515
SKATR1=6550
SKRDY=6555
PSCOMP=6542
SCOMP=6543
DONE=6576
/
/EXT MEMORY DEFINITION
RFQ=6201
DFI=6211
/
/EAE
ASR-7415
DAD=7443
DCM=7575
DDZ=7665
DLD=7663
DPSZ=7451
DST=7445
DVI=7407
MUY=7405
SHL=7413
SWAB=7431
/
KLIST=1000
/
```

```
FIXTAB
/
/
*0000
        0
        JMP I   .+1   /DECODE INTERUPT
        DCINT
/
/
*00010
/INDEXING REGISTERS
IX0,    0
IX1,    0
IX2,    0
IX3,    0
IX4,    0
IX5,    0
IX6,    0           /TASK LIST POINTER
IX7,    0           /I/O BUFFER POINTER
/
/
/CONSTANTS
I0,     0
I1,     1
I2,     2
I3,     3
I4,     4
I5,     5
I6,     6
I7,     7
I8,     10
I9,     11
I10,    12
I11,    13
I12,    14
I13,    15
I14,    16
I15,    17
I22,    26
I42,    52
I100,   1200
I1000,  1750
/
IM1,    -1
IM2,    -2
IM3,    -3
IM4,    -4
IM5,    -5
IM6,    -6
IM7,    -7
IM8,    -10
IM9,    -11
IM10,   -12
IM11,   -13
IM12,   -14
IM13,   -15
IM14,   -16
IM15,   -17
IM50,   -62
/
F0,     0000;   0000
F1,     0000;   4000
FP1,    6315;   0314
/
/ARGUMENT LIST
ARG0,   0
ARG1,   0
```

```
        ARG2,    0
        ARG3,    0
        ARG4,    0
        ARG5,    0
        ARG6,    0
        ARG7,    0
        /
        /
        /TEMPORARY STORAGE
        TMP0,    0
        TMP1,    0
        TMP2,    0
        TMP3,    0
        TMP4,    0
        TMP5,    0
        TMP6,    0
        TMP7,    0
        TMP10,   0
        TMP11,   0
        TMP12,   0
        TMP13,   0
        TMP14,   0
        TMP15,   0
        TMP16,   0
        TMP17,   0
        /
        /
        /REGISTERS
        IOP,     0            /INTEGER OPERATOR
        FOP,     0;  0                   /FRACTIONAL OPERATOR
        /
        /VARIABLES
        RATE,    0            /CLOCK RATE     (HZ)
        PERIOD,  0:  0                   /CLOCK PERIOD   (MS)
        /
        /
        /FLAGS
        SFLG,    0            /SATURATION FLAG
        BRFLG,   0            /BUFFER READY FLAG
        /
        /MASKS
        /
        MASK3,   0007
        MASK6,   0077
        MASK8,   0377
        MASK6C,  7700
        /
        /VECTORS
        CALL0,   CALL1        /SUBROUTINE CALL
        RIN0,    RTN1         /SUBROUTINE RETURN
        EXIT,    EXIT1        /EXIT FUNCTION
        DEFER,   DEFER1       /DEFER FUNCTION
        EXEC,    EXECR        /EXEC ENTRY POINT
        FFADD,   FFADD1       /FRACTION *FRACTION
        FFSUB,   FFSUB1       /FRACTION -FRACTION
        FNEG,    FNEG1        /NEGATE FRACTION
        FSHL,    FSHL1        /SHIFT FRACTION LEFT 1
        FSHR,    FSHR1        /SHIFT FRACTION RIGHT 1
        FABS,    FABS1        /ABSOLUTE VALUE OF FRACTION
        FIMUY,   FIMUY1       /FRACTION * INTEGER
        FFMUY,   FFMUY1       /FRACTION * FRACTION
        FFDIV,   FFDIV1       /FRACTION / FRACTION
        FIDIV,   FIDIV1       /FRACTION / INTEGER
        DINV,    DINV1        /DOUBLE INTEGER INVERT
        CLKI,    EXECI        /CLOCK INTERUPT VECTOR
        PLIST,   PLIST1       /PRIORITY LIST
        BRDY,    BRDY1        /BUFFER READ TEST
        IOBUF,   IOBUF1       /I/O BUFFER
```

```
NORD,    NORD1        /NO TTY READ
NOPT,    NOPT1        /NO TTY PRINT
TTYI,    NORD1        /TTY INPUT VECTOR
TTYO,    NOPT1        /TTY OUTPUT VECTOR
FLF,     FLF1
FLDFL,   FLDFL1
FIXF,    FIXF1
/
I50,     62
RCTIME,  0
DELAY,   DELAY1
READY,   READY1
RPFLG,   0
/
*0200
/
/INITIALIZE SYSTEM
/
START,   IOF
/
         SWAB
/
         CALL                /INITIALIZE EXEC
         CLREX
         CALL                /INITIALIZE 1/0
         CLRIO
/
         ION
         CALL                /BEGIN MAIN PROGRAM
         MAINP
CALL1,   0                   /SUBROUTINE CALL
/
         DCA CALL3           /SAVE AC
         TAD I CALL1         /GET SUBROUTINE ADDRESS
         ISZ CALL1
         DCA CALL2
         TAD I CALL2         /GET NUMBER OF ARGUMENTS
         ISZ CALL2
         SNA
         JMP CALL9           /NONE
/
         CIA
         DCA CALL5
         TAD CALL6
         DCA IX1
/
CALL8,   TAD I CALL1         /GET ARGUMENTS
         ISZ CALL1
         DCA IX1
         ISZ CALL5
         JMP CALL8
/
CALL9,   TAD CALL3           /RESTORE AC
/
         JMP I CALL2         /JUMP TO SUBROUTINE
/
RTN1,    JMP I CALL1         /RETURN FROM SUBROUTINE
/
CALL2,   0
CALL3,   0
CALL5,   0
CALL6,   ARG0 -1
/
CLKSRT,  0                   /CLOCK START
         CLA
         TAD CLRT            /SET RATE AND PERIOD
         DCA RATE
         TAD CIRT
         DCA PERIOD
/
```

```
            TAD CLMD           /SET CLOCK MODE
            CLDE
            CMA
            CLZE
/
            CLA CLL
            TAD CLCT           /SET CLOCK COUNT
            CLAB
            CLSA
/
            RETURN
/
CLMD,       5410               /CLOCK RATE = 10HZ, OV MODE
CLCT,       7640               /CLOCK COUNT = -96
CLRT,       175                /RATE = 125 HZ
CLPD,       10                 /PERIOD = 8 MS
/
/
CLKSTP,     0                  /CLOCK STOP
/
            STA
            CLZE               /CLEAR CLOCK
            RETURN
/
/
WAIT,       0                  /WAIT SUBROUTINE
/
            CLA
            DCA SFLG           /CLEAR SATURATION FLAG
/
WAIT1,      TAD SFLG           /WAIT UNTIL SET BY EXEC
            SNA
            JMP WAIT1
/
            RETURN
/
/
MOVE,       3                  /MOVE SUBROUTINE
/
            STA
            TAD ARG1           /SET POINTERS
            DCA IX0
            STA
            TAD ARG2
            DCA IX1
/
            TAD ARG0           /GET COUNT
            SPA SNA
            RETURN
/
            CIA
            DCA TMP0
/
MOVE1,      TAD I IX0          /MOVE A WORD
            DCA I IX1
/
            ISZ TMP0
            JMP MOVE1
/
            RETURN
/
LOAD,       1                  /LOAD SUBROUTINE
            CLA
            TAD I ARG0         /LOAD AC
/
            RETURN
/
```

```
DLOAD,      1                   /DOUBLE LOAD
/
            CLA
            TAD I ARG0          /LOAD AM
            ISZ ARG0
            MQL
            TAD I ARG0
/
            RETURN
/
STORE,      1                   /STORE SUBROUTINE
/
            DCA I ARG0          /STORE AC
/
            RETURN
/
DSTORE,     1                   /DOUBLE STORE
/
            SWP
            DCA I ARG0          /STORE AM
            ISZ ARG0
            SWP
            DCA I ARG0
/
            RETURN
/
LOAD1,      1                   /LOAD IMMEDIATE
/
            CLA
            TAD ARG0            /LOAD AC
/
            RETURN
/
/
DLOAD1,     2                   /DOUBLE LOAD IMMEDIATE
/
            CLA
            TAD ARG0            /LOAD AM
            MQL
            TAD ARG1
/
            RETURN
/
/
ADD1,       1                   /ADD IMMEDIATE
/
            TAD ARG0
/
            RETURN
/
DADD1,      2                   /DOUBLE ADD IMMEDIATE
/
            CLL
            SWP
            TAD ARG0
            SWP
            SZL
            IAC
            TAD ARG1
/
            RETURN
/
ABORT,      2                   /ABORT AND RETURN TO MAIN
/
            STA
            TAD I ARG0          /GET ADDRESS AND TEXT
            DCA ABORT1
            TAD ARG1
```

```
            DCA ABORT2      /ADDRESS OF ERROR TEXT M
/
            CALL            /ABORT MAIN PROGRAM
            MABORT
/
            CALL            /STOP CLOCK
            CLKSTP
/
            CALL            /CLEAR EXEC
            CLPEX
/
            CALL            /CLEAR 1/0
            CLRI0
            CAF
            SWAB
            ION
/
            CALL            /PRINT ERROR AND ADDRESS
            BELL
            12
            CALL
            CRLF
            CALL
            ALPHA
ABORT2,     0               /ADD° OF ERROR TEXT MESS
            CALL
            SPACE
            5
            CALL
            OOUT
            ABORT1
            CALL
            PRINT
/
            CALL            /RETURN TO MAIN PROGRAM
            MAINP
ABORT1,     0
CLR10,      0               /CLEAR 1/0
            CLA
            TAD NORD        /RESET INTER PT VECTORS
            DCA TTYI
            TAD NOPT
            DCA TTY0
/
            TAD IOBUF       /RESET BUFFER POINTER
            IAC
            DCA IX7
/
            STA
            DCA BRFLG       /SET BUFFER READY
/
            RETURN
/
CLREX,      0               /CLEAR EXEC
/
            STA
            TAD PLIST       /INITIALIZE LIST POINTER
            DCA IX6
/
CLREX1,     DCA I IX6       /CLEAR FLAGS
            DCA I IX6
/
            TAD I IX6       /TEST FOR END OF LIST
            TAD CLREX4
            SNA
            JMP CLREX2      /END
/
            CLA
```

```
                TAD IX6         /ADVANCE POINTER
                TAD I4
                DCA IX6
                JMP CLREX1
/
CLREX2,         STA
                DCA I CLREX3    /SET MAIN ACTIVE
                RETURN
/
CLREX3,         MAIN+1
CLREX4,         -MAINP
INCLD,          1               /INCLUDE TASK IN LIST
/
                STA
                DCA I ARG0      /SET REQUEST FLAG
                RETURN
/
/
EXCLD,          1               /EXCLUDE TASK FROM LIST
                CLA
                DCA I ARG0
                RETURN
/
/
/EXIT FROM TASK AND CALL EXEC
/
EXIT1,          IOF
                CLL STA RAL     /-2
                TAD IX6         /BACK UP LIST POINTER
                DCA IX6
/
                DCA I IX6       /CLEAR TASK ACTIVE
                TAD IX6         /ADVANCE LIST POINTER
                TAD I5
                DCA IX6
/
                JMP I EXEC      /EXIT TO EXEC
/DEFER TASK AND CALL EXEC
/
DEFER1,         0               /(ENTER WITH INTERUPTS OFF!)
/
                HLT             /NOT CURRENTLY ALLOWED
                DCA I IX6       /SAVE AC, MQ; FLAGS; AND LOCATION
                MQA
                DCA I IX6
                GTF
                DCA I IX6
                TAD DEFER1
                DCA I IX6
/
                JMP I EXEC      /EXIT TO EXEC
/TEST FOR CPU SATURATION
STEST1,         NOP
/
                CLA
                TAD SFLG
                SZA
                JMP STEST2      /SATURATION
                STA
                DCA SFLG        /SET SATURATION FLAG
                JMP I EXIT
/
STEST2,         IOF
                CALL
                ABORT
                MAIN+6
                SNTXT
/
```

```
SNTXT,      2425                /'SATURATION'
            2225
            2201
            2411
            1716
            0000
/
/EXECUTIVE PRIORITY TASK PROCESSOR
/
/CLOCK INTERUPT ENTRY POINT
EXEC1,      DCA I IX6           /SAVE AC, MQ' FLAGS; AND ADDRESS
            MQA
            DCA I IX6
            GTF
            DCA I IX6
            TAD 0
            DCA I IX6
/
            CLSA                /RESET CLOCK
/
            STA
            TAD PLIST           /INITIALIZE POINTER
            DCA I X6
/EXIT AND DEFER ENTRY POINT
EXECR,      TAD I IX6
            SNA
            JMP EXEC5           /TASK NOT REQUESTED
/
            CLA
            TAD I IX6
            SZA
            JMP EXEC7           /TASK IS ACTIVE
            STA
            TAD IX5             /BACK UP POINTER
            DCA IX6
            STA
            DCA I IX6           /SET TASK ACTIVE
            TAD I IX6           /GET TASK ADDRESS
            DCA EXEC4
            ION
            JMP I EXEC4         /EXIT TO REQUESTED TASK
/
EXEC5,      TAD I IX6
            SNA
            JMP EXEC6           /TASK NOT ACTIVE
EXEC7,      CLA IAC             /I
            TAD IX5             /ADVANCE LIST POINTER
            DCA IX6
/
            TAD I IX6           /GET AC, MQ, FLAGS, AND LOCATION
            DCA EXEC1
            TAD I IX6
            DCA EXEC2
            TAD I IX6
            DCA EXEC3
            TAD I IX6
            DCA EXEC4
            TAD IX6             /BACK UP LIST POINTER
            TAD I M4
            DAC IX6
/
            TAD EXEC3           /RESTORE FLAGS, MQ, AND AC
            RTF
            CLA
            TAD EXEC2
            MQL
            TAD EXEC1
            JMP I EXEC4         /EXIT TO ACTIVE TASK
```

```
/
EXEC6,    TAD IX6             /ADVANCE LIST POINTER
          TAD I5
          DCA IX6
/
          JMP EXECR           /TEST STATUS OF NEXT TASK
/
/
EXEC1,    0                   /AC
EXEC2,    0                   /MQ
EXEC3,    0                   /FLAGS
EXEC4,    0                   /LOCATION
/INTERUPT DECODE
/
DCINT,    CLSK
          JMP .+2
          JMP I CLK1          /CLOCK INTERUPT
/
          DCA TTY1            /SAVE AC, MQ, AND FLAGS
          ACL
          DCA TTY2
          GTF
          DCA TTY3
/
          KSF
          JMP TTY4
          JMS I TTY0          /PRINTER INTERUPT
/
          CLA
          TAD TTY3
          RTF
          CLA
          TAD TTY2
          MQL
          TAD TTY1
          ION
          JMP I 0             /RETURN TO INTERRUPTED LOCATION
TTY6,     HLT                 /TEMP UNKNOWN INTERUPT HALT
          ION
          JMP I 0
/
TTY1,     0                   /AC
TTY2,     0                   /MQ
TTY3,     0                   /FLAGS
/
/         PRIORITY LIST
PLIST1=.
/
ADIN,     0                   /A/D INPUT (0)
          0
          AD01
          0
          0
          0
          0
RCAD,     0                   /RECORD A/D INPUT (0)
          0
          RCAD1
          0
          0
          0
          0
/
/
TCTRL,    0                   /TRACE CONTROL (0)
          0
```

```
          TCTRL1
          0
          0
          0
          0
/
DAOUT,    0               /D/A OUTPUT*(0)
          0
          DA01
          0
          0
          0
          0
/
SLOPE,    0               /SLOPE CALC°(0)
          0
          SLF01
          0
          0
          0
          0
/
STEST,    0               /SATURATION TEST
          0
          STEST1
          0
          0
          0
          0
/
MAIN,     0               /MAIN PROGRAM
          0
          MAINP
          0
          0
          0
          0
READ,     0               /READ FROM TTY
/
          JMS I BROY      /WAIT FOR BUFFER READY
          IOF
          CLA
          TAD READ2       /SET INPUT INTERUPT VECTOR
          DCA TTYI
/
          TAD IOBUF       /SET BUFFER POINTER
          IAC
          DCA IX7
          DCA BRFLG       /CLEAR BUFFER READY FLAG
/
          ION
          RETURN
/
/
TELETYPE INPUT INTERUPT ROUTINE
/
READ4,    0
          KRB             /INPUT CHARACTER
          AND MASK8
          MQL
/
          ACL
          JMS EMTEST
          ACL
          TAD READ8       /CHECK FOR RUBOUT
          SNA
```

```
            JMP READ9
/
            ACL
            TLS                 /OUTPUT CHARACTER
/
            TAD READ6           /CHECK FOR CR
            SNA
            JMP READ3
            ACL
            DCA I IX7           /STORE CHAR IN BUFFER
            JMP I READ4
READ3,      DCA I IX7           /STORE 0 IN BUFFER
            TAD IOBUF           /RESET BUFFER POINTER
            IAC
            DCA IX7
/
            TAD NORD            /RESET INPUT INTERUPT VECTOR
            DLA TTYI
            TAD READ7           /SET OUTPUT INTERUPT VECTOR
            DCA TTYO
            JMP I READ4
PEAD9,      TAD READ10          /OUTPUT BACK '/'
            TLS
/
            CLA IAC             /RESET BUFFER POINTER
            TAD IOBUF
            DCA IX7
            JMP I READ4
/
/LAST CHARACTER ECHO INTERUPT
/
READ5,      0
/
            TCF                 /CLEAR PRINTER
            STA
            DCA BRFLG           /SET BUFFER READY FLAG
            TAD NOPT            /RESET OUTPUT INTERUPT VECTOR
            DCA TTYO
/
            JMP I READ5
/
READ2,      READ4
READ6,      -0215
READ7,      READ5
READ8,      0377
READ10,     0334
/
/
/IGNORE TTY INPUT INTERUPT
NORD1,      0
            KRB
            AND MASK8
            JMS EMTEST          /EMERGENCY TEST
            JMS I NORD1
            JMP I NORD1
/
PRINT,      0                   /PRINT ON TT
            JMS I BRDY          /WAIT FOR BUFFER READY
            IOF
/
            CLA
            TAD PRNT2           /SET OUTPUT INTERUPT VECTOR
            DCA TTYO
            DCA I IX7           /STORE 0 in BUFFER
            STA
            TAD IOBUF           /SET BUFFER POINTER
            DCA IX7
```

```
                DCA BRFLG       /CLEAR BUFFER READY FLAG
                TAD I IX7       /PRINT FIRST CHAR
                TLS
                ION
                RETURN
/
/
/TELETYPE OUTPUT INTERUPT ROUTINE
PRNT6,  0
        CLA
        TAD I IX7               /GET NEXT CHAR
        SNA
        JMP PRNT7               /DONE
        TLS                     /OUTPUT CHAR
        JMP I PRNT6
PRNT7,  TCF                     /CLEAR PRINTER FLAG
        CLA CLL
        TAD IOBUF               /RESET BUFFER POINTER
        DCA IX7
        STA
        DCA BRFLG               /SET BUFFER READY FLAG
        TAD NOPT                /RESET INTERUPT VECTOR
        DCA TTYO
        JMP I PRNT6
PRNT2,  PBNT6
/IGNORE TTY OUTPUT INTERUPT
NOPT1,  0
        TCF                     /CLEAR KEYBOARD
        JMP I NOPT1
BRDY1,  0                       /WAIT FOR BUFFER READY
/
BRDY2,  CLA
        TAD BRFLG
        SZA
        JMP 1 BRDY1             /READY
        JMP BRDY2
/
EMTEST, 0                       /EMERGENCY TEST
        DCA EMER2
        TAD EMFLG
        SNA CLA
        JMP I EMTEST            /EMP TST NOT REQUESTED
        TAD EMER2
        TAC EMER3
        SNA CLA
        SKP
        JMP 1 EMTEST            /NOT EMER KEY (SPACE)
        IOF
        CALL
        ABORT
        EMER2
        EMTXT
EMER2,  0
EMER3,  -240
EMTXT,  0515                    /EMERGENCY
        0522
        0705
        1603
        3100
EMFLG,  0
MATCH,  2                       /MATCH ALPHANUMBERIC INPUT
        STA
        TAD ARG0                /GET TEXT ADDRESS
        DCA IX0
        JMS I BRDY              /BUFFER READ-TEST
        CLA
        TAD IX7                 /SAVE BUFFER POINTER
        DCA IMP2
```

```
MATCH2,    CLA
           TAD I M2            /COUNT Δ-2
           DCA TMP0
/
           TAD I IX0           /GET 2 CHARS
           MQL
           ACL
MATCH1,    AND MASK6C          /NEXT CHAR
           SNA
           JMP I ARG1          /MATCH
           DCA TMP1
           TAD I IX7           /NEXT CHAR IN BUFFER
           SNA
           JMP MATCH3          /NO MATCH
/
           BSW
           AND MASK6C
           CIA
           TAD TMP1
           SZA
           JMP MATCH3          /NO MATCH
           ACL
           BSW
           ISZ TMP0
           JMP MATCH1
           JMP MATCH2
MATCH3,    CLA
           TAD TMP2            /RESTORE BUFFER POINTER
           DCA IX7
/
           RETURN
ALPHA,     1                   /ALPHANUMERIC OUTPUT
           STA
           TAD ARG0            /GET TEXT ADDRESS
           DCA IX0
/
           JMS I BROY          /BUFFER READ-TEST
/
ALPHA6,    CLA
           TAD IM2             /COUNT Δ-2
           DCA TMP0
/
           TAD I IX0           /GET 2 CHARS
           MQL
           ACL
/
ALPHA5,    AND MASK6C          /NEXT CHAR
           SNA
           RETURN              /DONE
/
           SMA
           TAD I1              /CONVERT TO ASC11
           TAD I2
           BSW
           DCA I IX7           /STORE IN BUFFER
           ACL
           BSW
           ISZ TMP0
           JMP ALPHA5
           JMP ALPHA6
CLRB,      0                   /INITIALIZE BUFFER POINTER
           JMS I BRDY          /WAIT UNTIL BUFFER READY
/
           CLA IAC
           TAD IOBUF
           DAC IX7
           RETURN
/
```

```
CRLF,      0                    /CR, LF OUTPUT
           JMS I BRDY           /WAIT UNTIL BUFFER READY
/
           CLA                  /PUT CR, LF IN BUFFER
           TAD CRLF1
           DCA I I.X7
           TAD CRLF2
           DCA I.I.X7
           RETURN
/
CRLF1,     0215
CRLF2,     0212
/
/
BELL,      1                    /BELL OUTPUT
           JMS I BRDY           /WAIT UNTIL BUFFER READY
           CLA
           TAD ARG0             /GET COUNT
           SPA SNA
           RETURN
/
           CIA
           DCA TMP0
BELL2,     TAD BELL1            /PUT BELLS IN BUFFER
           DCA I I.X7
           ISZ TMP0
           JMP BELL2
/
           RETURN
BELL1,     0207
/
SPACE,     1                    /SPACE OUTPUT
           JMS I BRDY           /WAIT FOR BUFFER READY
           CLA
           TAD ARG0             /GET COUNT
           SPA SNA
           RETURN
/          CIA
           DCA TMP0
SPACE1,    TAD SPACE2           /PUT SPACES IN BUFFER
           DCA I I.X7
           ISZ TMP0
           JMP SPACE1
/
           RETURN
SPACE2,    0240
/
IIN,       1                    /POSITIVE INTEGER INPUT
           JMS I BRDY           /WAIT FOR BUFFER READY
           CLA
           DCA TMP0             /VALUE Δ 0
           TAD I10
           DCA IOP
/
IIN1,      TAD I IX7            /GET NEXT DIGIT
           SNA
           JMP IIN2,            /DONE
/
           TAD IIN3,            /CONVERT TO BINARY
           DCA TMP1
/
           TAD TMP0             /VALUE Δ VALUE*10*DIGIT
           MQL
           JMS I FIMUY
           SZA
           JMP IIN4,            /OVERFLOW
/
```

```
            ACL
            TAD TMP1
            DCA TMP0
            JMP IIN1
/
IIN2,       TAD TMP0
            DCA I ARG0
            RETURN
/
IIN4,       CALL
            ABORT
            CALLT
            I ETXT
/
IIN3,       -260
/
IETXT,      1116            /'INPUT ERROR'
            2025
            2440
            0522
            2217
            2200
/
IOUT,       1               /INTEGER OUTPUT
            HLT
            RETURN
/
FIN,        1               /POSITIVE FRACTION INPUT
            JMS I BRDY      /WAIT FOR BUFFER READY
            CLA
            TAD I I.X7      /TEST FOR POINT
            TAD FIN1
            SZA
            JMP FIN2        /OVERFLOW
/
            DCA TMP0        /COUNT Δ 0
            TAD FP1         /FOP Δ °1
            DCA FOP
            TAD FP1+1
            DCA FOP+1
            TAD TMP2        /RESULT ΔO
FIN7,       STA
            TAD TMP0
            DCA TMP2+1
/
FIN7,       STA
            TAD TMP0        /COUNT Δ COUNT-1
            DCA TMP0
            TAD TMP0
            DCA TMP1
/
            TAD I I.X7      /PROCESS NEXT DIGIT
            SNA
            JMP FIN3        /DONE
/
            TAD FIN4
            DCA IOP
            TAD FP1
            MQL
            TAD FP1+1
            JMS I FIMUY     /TIMES °1
            ISZ TMP1
            JMP .+2
            JMP FIN5
/
FIN6,       JMS I FFMUY     /TIMES °1
            ISZ TMP1
            JMP FIN6
/
```

```
         FIN5,   CLL                 /ADD TO RESULT
                 SWP
                 TAD TMP2
                 DCA TMP2
                 ACL
                 SZL
                 IAC
                 TAD TMP2+1
                 DCA TMP2+1
/
                 JMP FIN7
         FIN3,   TAD TMP2            /STORE RESULT
                 DCA I ARG0
                 ISZ ARG0
                 TAD TMP2+1
                 DCA I ARG0
/
                 RETURN
/
         FIN2,   10F
                 CALL
                 ABORT
                 CALL1
                 IETXT
/
         FIN1,   -256
         FIN4,   -260
         FOUT,   1
                 HLT
                 RETURN
/
         OIN,    1
                 HLT
                 RETURN
         OOUT,   1                   /OCTAL OUTPUT
/
                 JMS I BRDY          /WAIT FOR BUFFER READY
                 CLA
                 TAD IM4             /COUNT A -4
                 DCA TMP0
/
                 TAD I ARG0          /GET VALUE
                 RTL
                 RTL
                 MQL
/
         OOUT1,  ACL                 /GET NEXT 3 BITS
                 RAL
                 RTL
                 SWP
/
                 AND MASK3           /CONVERT AND PUT IN BUFFER
                 TAD OOUT2
                 DCA I IX7
/
                 ISZ TMP0
                 JMP OOUT1
                 RETURN
/
         OOUT2,  0260
/I/O  BUFFER
         IOBUF1, 0215                /CR,LF
                 0212
/FRACTION IN AM PLUS FRACTION IN TOP
         FFADD1, 0
/
                 DST                 /SAVE AM
                 FFADD2
                 SPA
```

```
            JMP FFADD3       /NEGATIVE
/
            DLD              /GET FOP
            FOP
            SPA
            JMP FFADD4       /NEGATIVE
/
            DAD              /SUM AND TEST
            FFADD2
            SPA
            JMP FFADD5       /OVERFLOW
/
            JMP I FFADD1
/
FFADD3,     DLD              /GET FOP
            FOP
            SMA
            JMP FFADD4       /POSITIVE
/
            DAD              /SUM AND TEST
            FFADD2
            SMA
            JMP FFADD5       /OVERFLOW
/
            JMP I FFADD1
FFADD4,     DAD              /SUM
            FFADD2
/
            JMP I FFADD1
/
FFADD5,     IOF
            CALL
            ABORT
            FFADD1
            OVTXT
FFADD2,     0;        0
/FRACTION IN AM MINUS FRACTION IN FOP
FFSUB1,     0
/
            DST              /SAVE AM
            FFSUB2
            SPA
            JMP FFSUB3       /NEGATIVE
/
            DLD
            FOP
            DCM
            SPA
            JMP FFSUB4       /NEGATIVE
/
            DAD              /SUM AND TEST
            FFSUB2
            SPA
            JMP FFSUB5       /OVERFLOW
/
            JMP I FFSUB1
/
FFSUB3,     DLD              /GET FOP
            FOP
            DCM
            SMA
            JMP FFSUB4       /POSITIVE
/
            DAD              /SUM AND TEST
            FFSUB2
            SMA
            JMP FFSUB5       /OVERFLOW
/
```

```
              JMP I FFSUB1
FFSUB4,  DAD                    /SUM
              FFSUB2
/             JMP I FFSUB1
/
FFSUB5,  IOF
              CALL
              ABORT
              FFSUB1
              OVTXT
/
FFSUB2,  0;         0
/NEGATE FRACTION IN AM
FNEG1,   0
/
              DCM
              JMP I FNEG1
/
/SHIFT FRACTION IN AM LEFT 1
FSHL1,   0
              SPA
              JMP FSHL2         /NEGATIVE
/
              SHL
              1
              SPA
              JMP FSHL3         /OVERFLOW
/
              JMP I FSHL1
/
FSHL2,   SHL
              1
              SMA
              JMP FSHL3         /OVERFLOW
              JMP I FSHL1
/
FSHL2,   SHL
              1
              SMA
              JMP FSHL3         /OVERFLOW
/
              JMP I FSHL1
FSHL3,   IOF
              CALL
              ABORT
              FSHL1
              OVTXT
/
/SHIFT FRACTION IN AM RIGHT 1
FSHR1,   0
              ASR
              1
              JMP I FSHR1
/
/ABSOLUTE VALUE OF FRACTION IN AM
FABS1,   0
              SPA
              DCM               /DOUBLE PRECISION COMPLIMENT
/
              JMP I FABS1
/FRACTION IN AM TIMES POSITIVE INTEGER IN IOP
FIMUY1,  0
              SPA
              JMP FIMUY2        /NEGATIVE
              DPSZ
              JMP FIMUY3        /POSITIVE
/
```

```
              JMP I FIMUY1         /ZERO
/
FIMUY3,       JMS FIMUY4           /POSITIVE PRODUCT
              JMP I FIMUY1
/
FIMUY2,       DCM
              JMS FIMUY4
              DCM
              JMP I FIMUY1
/
FIMUY4,       0
              DCA FIMUY5           /SAVE FU
/
              MUY
              IOP
              DST
              FIMUY6
/
              CLA
              TAD FIMUY5           /FU * 1
              MQL
              MUY
              IOP
/
              SZA
              JMP FIMUY7           /OVERFLOW
/
              CLA SWP/(FU * 1)*2**12*($F_L$ * 1)
              DAD
              FIMUY6
              JMP I FIMUY4
/
FIMUY7,       IOF
              CALL
              ABORT
              FIMUY1
              OVTXT
/
FIMUY5,       0
FIMUY6,       0 ;      0
/
/FRACTION IN AM TIMES POSITIVE FRACTION IN FOP
FFMUY1,       0
              SPA
              JMP FFMUY2           /NEGATIVE
/
              DPSZ
              JMP FFMUY3           /POSITIVE
/
              JMP I FFMUY1         /ZERO
/
FFMUY3,       JMS FFMUY4           /POSITIVE PRODUCT
              JMP I FFMUY1
FFMUY2,       DCM                  /NEGATIVE PRODUCT
              JMS FFMUY4
              DCM
              JMP I FFMUY1
/
FFMUY4,       0
              SHL                  /F1 * 2
              1
              DCA FFMUY5           /SAVE F1U
/
              MUY
              FOP+1
              DST
              FFMUY6
              CLA
```

```
            TAD FFMUY5
            MQL
            MUY
            FOP
            DAD
            FFMUY6
/
            MQL                     /RESULT*2**-12 + FIU*F20
            TAD FFMUY5
            SWP
            MUY
            FOP+1
/
            JMP I FFMUY4
FFMUY5,     0;0
FFMUY6,     0
/FRACTION IN AM DIVIDED BY POSITIVE INTEGER IN IOP
/
FIDIVI,     0
            SPA
            JMP FIDIV2              /NEGATIVE
            DPSZ
            JMP FIDIV3              /POSITIVE
/
            JMP I FIDIV1            /ZERO
/
FIDIV3,     JMS FIDIV4              /POSITIVE RESULT
            JMP I FIDIV1
/
FIDIV2,     DCM                     /NEGATIVE RESULT
            JMS FIDIV4
            DCM
            JMP I FIDIV1
FIDIV4,     0
            SWP
            DCA FIDIV5              /SAVE FL
/
            FAD IOP
            SNA
            JMP FIDIV7              /DIVISION BY ZERO
            CLA
            DVI                     /FU/IOP
            IOP
            SWP
            DCA FIDIV6
/
            TAD FIDIV5              /R(FU/IOP)*FL/IOP
            SWP
            DVI
            IOP
/
            CLA CLL
            TAD FIDIV6              /Q(FU/IOP)*2**12 * Q(ABOVE)
/           JMP I FIDIV4
FIDIV7,     IOF
            CALL
            ABORT
            FIDIV1
            OVTXT
FIDIV5,     0
FIDIV6,     0
/INVERT DOUBLE INTEGER IN AM
DINV1,      0
/
            SPA
            JMP DINV2               /NEGATIVE
            DPSZ
            JMP DINV3               /POSITIVE
```

```
              JMP DINV8        /DIVISION BY ZERO
/
DINV3,   JMS DINV4        /POSITIVE RESULT
         SPA
         JMP DINV8        /OVERFLOW
         JMP I DINV1
/
DINV2,   DCM              /NEGATIVE RESULT
         JMS DINV4
         SPA
         JMP DINV8        /OVERFLOW
/
         DCM
         JMP I DINV1
/
DINV4,   0
         DST              /SAVE D
         SNA
         JMP DINV6        /DU = 0
/
         SWP
         SNA
         JMP DINV7        /DL = 0
/
         MQL              /L/U
         DVI
         DINV5+1
/
         CLA SWP
         SNA
         JMP DINV7        /L/U = 0
         STL RAR          /(2**12 + L/U)/2
         DCA DINV9
/
         STL RTR          /2**22/((2**-2 + L/U)/2)
         DVI
         DINV6
/
         CLA CLL
         DVI              /RESULT/U
         DINV5+1
/
         CLA CLL
         JMP I DINV4
/
DINV7,   CAM
         STL RAR          /2**11/U
         MQL
         DVI
         DINV5+1
/
         CLA CLL
         JMP I DINV4
/
DINV6,   SWP
         TAD IM1
         SNA
         JMP DINV8        /DIVISION BY ONE
/
         CAM
         STL RAR          /2**23/L
         MQL
         DVI
         DINV5
         SWP
         DCA DINV9
         SWP
         DVI
```

```
            DINV5
            CLA
            TAD DINV9
            JMP I DINV4
DINV8,      IOF
            CALL
            ABORT
            DINVT
            OVTXT
/
DINV5,      0;    0
DINV9,      0
/
/
/FRACTION IN AM DIVIDED BY POSITIVE FRACTION IN FOP
/12 BIT ACCURACY
FFDIV1,     0
            SPA
            JMP FFDIV2          /NEGATIVE
/
            DPSZ
            JMP FFDIV3          /POSITIVE
/
            JMP I FFDIV1        /ZERO
/
FFDIV3,     JMS FFDIV4          /POSITIVE RESULT
            JMP I FFON1
/

FFDIV2,     DCM                 /NEGATIVE RESULT
            JMS FFDIV4
            DCM
            JMP I FFDIV1
/
FFDIV4,     0
            ASR                 /QU = D/FU/2
            1
            DVI
            FOP
/
            SZL
            JMP FFDIV5          /OVERFLOW
/
            CLA
            SWP
/
            JMP I FFDIV4
/
FFDIV5,     IOF
            CALL
            ABORT
            FFDIV1
            OVTXT
/
OVTXT,      1726    /'OVERFLOW'
            0522
            0614
            1727
            0000
/
/
MAINP.,     0                   /MAIN PROGRAM
/
            CALL                /INITIALIZE SYSTEM
            TSYS
/
```

```
MAIN2,   CALL                /COMMAND LOOP
         TYPE
         CMTXT
/
         CALL                /'SETUP'?
         MATCH
         SETXT
         SETUP
         CALL                /'RECORD'?
         MATCH
         RETXT
         RCORD
/
         CALL                /'PLAYBACK'?
         MATCH
         PBTXT
         PBACK
/
         CALL                /'PRINT'
         MATCH
         PRTXT
         SHOWG
/
         CALL                /'TEST'
         MATCH
         TSTTXT
         PBTEST
/
         CALL                /UNKNOWN COMMAND
         CLRB
         CALL
         ALPHA
         UCTXT
         CALL
         PRINT
/
         JMP MAIN2
/
MAINR,   0                   /RETURN TO MAIN PROG
/
         JMP MAIN2
/
CMTXT,   0317                /'COMMAND'
         1515
         0116
         0472
         4000
SUTXT,   2305                /'SETUP'
         2425
         2000
RDTXT,   2205                /'RECORD'
         0317
         2204
         0000
RDTXT,   2614                /'PLAYBACK'
         0131
         0201
         0313
         0000
UCTXT,   2516                /'UNKNOWN COMMAND'
         1316
         1727
         1640
         0317
         1515
         0116
         0400
PRTXT,   2022                /'PRINT'
```

```
            1116
            2400
TSTTXT,     2405                /'TEST'
            2324
            0000
MABORT,     0                   /ABORT MAIN PROG
            CLA                 /CLEAR COMPUTER CONTROL
            SELECT
/
            RETURN
/
/
CCOUT,      0                   /COMPUTER CTRL OUT
            CLA
            SELECT
            RETURN
/
/
ATR1,       1                   /TEST ATP
            JMP ATR3              7000    NOP FOR ATR CONTROL
            SKATR1
            JMP I ARG0
            RETURN
                                SW = 0 INDICATES ATR ON
/
ATR3,       CLA
            OSR
            SZA                 /INCL OP SW WITH AC
            JMP I ARG0          /FALSE
            RETURN              /TRUE
READY1,     0                   /TEST READY SUBROUTINE
/
/A CARRIAGE RETURN KEY ON THE TELETYPE SIGNALS
/READY° TO CHANGE INTO AUTO MODE, DEPOSIT NOP
/INTO READY1 +1°
/
            JMP READY3
            SKRDY               /TEST FOR RD-ON
            JMP .-1
            JMP I READY1        /RETURN
/
READY3,     CALL                /PRINT 'READ- =
            TYPE
            DNTXT
            CALL                /WAIT FOR CR
            CLRB
            JMP I READY1        /RETURN
DONE1,      0                   /GENERATE DONE PULSE
            NOP
            DONE
            JMS I DELAY
            READY
ISYS,       0                   /INITIALIZE SYSTEM
/
            CALL                /RELEASE COMPUTER CONTROL
            CCOUT
/
            CALL
            TYPE
            POTXT
            CALL
            CLRB
/
ISYS2,      CALL                /GET MAX VEL (IPM)
            TYPE
            MVTXT
            CALL
            SPEED
            PTOP10
```

```
/
            CALL              /0 < MAXV < 12?
            LOAD
            PTOP10
            SPA SNA
            JMP ISYS1
            CALL
            ADD1
            -26
            SMA SZA
            JMP ISYS1
/
            CALL              /GET MAX ACC (*°00IG)
            TYPE
            MATXT
            CALL
            IIN
            MAXA
/
            CALL              /0 <MAXA < .1+?
            LOAD
            MAXA
            SPA SNA
            JMP ISYS1
            CALL
            ADD1
            -144
            SPA
            JMP ISYS3
/
ISYS1,      CALL              /TOO BIG
            CLRB
            CALL
            ALPHA
            BVTXT
            CALL
            PRINT
            JMP ISYS2
ISYS3,      CALL              /GET SCALE FACTORS (V/IN)
            CLRB
            CALL
            CRLF
            CALL
            ALPHA
            SFTXT
            CALL
            CRLF
            CALL
            ALPHA
            XSTXT
            CALL
            PRINT
            CALL
            READ
            CALL
            FIN
            XSCL
/
            CALL
            CLRB
            CALL
            ALPHA
            YSTXT
            CALL
            PRINT
            CALL
            READ
            CALL
```

```
            FIN
            YSCL
/
            CALL
            CLRB
            CALL
            ALPHA
            ZSTXT
            CALL
            PRINT
            CALL
            READ
            CALL
            FIN
            ZSCL
/
            CALL
            CLRB
            CALL
            ALPHA
            TSTXT
            CALL
            PRINT
            CALL
            READ
            CALL
            FIN
            TSCL
/
/
/
ISY9,       CALL
            CLRB
            CALL
            ALPHA
            PSTXT
            CALL
            PRINT
            CALL
            READ
            CALL
            FIN
            PSCL
            CALL                    /CONVERT TO INTERNAL
            MOVE
            1
            VSCL
            IOP
/
            CALL
            DLOAD
            XSCL
            JMS I FIDIV
            CALL
            DSTOPE
            XSCL
/
            CALL
            DLOAD
            YSCL
            JMS I FIDIV
            CALL
            DSTOPE
            YSCL
/
            CALL
            DLOAD
            ZSCL
```

```
          JMS I FIDIV
          CALL ; DSTOPE
          ZSCL
/
          CALL
          DLOAD
          TSCL
          JMS I FIDIV
          CALL
          DSTOPE
          TSCL
          CALL
          DLOAD
          PSCL
          JMS I FIDIV
          CALL
          DSTOPE
          PSCL
/
          CALL                /GET GAINS
          CLRB
          CALL
          CRLF
          CALL
          ALPHA
          GNTXT
          CALL
          CRLF
          CALL
          ALPHA
          XSTXT
          CALL
          PRINT
          CALL
          READ
          CALL
          IIN
          XGAIN
/
          CALL
          CLRB
          CALL
          ALPHA
          YSTXT
          CALL
          PRINT
          CALL
          READ
          CALL
          IIN
          YGAIN
/
          CALL
          CLRB
          CALL
          ALPHA
          ZSTXT
          CALL
          PRINT
          CALL
          READ
          CALL
          IIN
          ZGAIN
/
          CALL
          CLRB
          CALL
```

```
            ALPHA
            TSTXT
       CALL
            PRINT
       CALL
            READ
       CALL
            IIN
            TGAIN
 /
       CALL
            CLRB
       CALL
            ALPHA
            PSTXT
       CALL
            PRINT
       CALL
            READ
       CALL
            IIN
            PGAIN
 /
       CALL                /RETURN TO MAIN PROG
            MAINP
 /
POTXT,      2017    /'POWER ON: '
            2706
            2240
            1716
            7240
            0000
 /
 /
MVTXT,      1501    /'MAX VEL (IPM):'
            3040
            2605
            1440
            5011
            2015
            5172
            4000
MATXT,      1501    /'MAX ACC(°001G):'
            3040
            0103
            0340
            5056
            6060
            6107
            5172
            4000
SFTXT,      2303    /'SCALE FACTORS (V/IU):'
            0114
            0540
            0601
            0324
            1722
            2340
            5026
            5711
            1651
            7200
XSTXT,      3072    /'X:'
            4000
YSTXT,      3172    /'Y:'
            4000
```

```
ZSTXT,     3272        /'Z:'
           4000
TSTXT,     2472        /'T:'
           4000
PSTXT,     2072        /'P:'
           4000
GNTXT,     0701        / GAINS (IPS)'
           1116
           2340
           5011
           2023
           5100
/
/
SHOW0,     NOP
           CALL
           CRLF
           CALL
           PRINT
           CALL                    /GET DESIRE AXIS
           READ
           CALL
           IIN
           SHOW5
           CLA
           TAD I4
           MQL
           MUY
           SHOW5
           SWP
           TAD SHOW2
           DCA IX0
           TAD I SHOW1             /SET KNOT COUNT
           CIA
           DCA SHOW10
SHOW19,    CALL
           CLRB
           CLA
           TAD IX0
           IAC
           JMS SHOW11
           JMS I SHOW3             /GET X
           JMS SHOW11              /PRINT AC
           SWP
           JMS SHOW11              /PRINT MQ
           JMS I SHOW3             /GET DX/DT
           JMS SHOW11              /PRINT AC
           SWP
           JMS SHOW11              /PRINT MQ
           CALL
           PRINT
           CLA
           TAD IX0                 /ADVANCE ADDRESS
           TAD SHOW4
           DCA IX0
           ISZ SHOW10
           JMP SHOW19
           CALL
           MAINP                   /RETURN TO COMMAND
SHOW1,     NKTS                    /NUMBER OF KNOTS
SHOW2,     KLIST-1                 /KNOT STORAGE
SHOW3,     KTOK14
SHOW4,     20
SHOW5,     0
SHOW10,    0
SHOW11,    0                       /PUT AC & SPACE INTO BUFF
           DST
```

```
                SHOW12          /SAVE AM
                CALL
                SPACE
                1
                CALL
                DOUT
                SHOW12+1
                CLA
                TAD SHOW12
                MQL
                JMP I SHOW11    /RETURN
SHOW12,         0
                0
/
SETUP,          NOP             /SET UP PLAYBACK LOOP
                CALL            /SATRT SAMPLING POSITION
                INCLD
                ADIN
                CALL
                CLKSRT
/
                CALL
                TYPE
                SPTXT
                CALL            /AT START POS?
                CLRB
                CALL            /STORE START POSITION
                CALL
                MOVE
                12
                XXI
                XSP
                CALL
                TYPE
                SSTXT
                CALL            /AT START OF SEAM?
                CLRB
/
                CALL            /STORE START OF SEAM
                MOVE
                12
                XXI
                XSS
/
                CALL
                TYPE
                ESTXT
                CALL            /AT END OF SEAM?
                CLRB
/
SETUP5,         CALL            /STORE END OF SEAM
                MOVE
                12
                XXI
                XES
/
                CALL
                TYPE
                RPTXT
                CALL            /AT RETRACT POS?
                CLRB
/
                CALL            /STORE RETRACT POS
                MOVE
                12
                XXI
                XRP
/
```

```
              CALL              /STOP SAMPLING
              CLKSTP
              CALL
              EXCLD
              ADIN
/SETUP2,      CALL
              TYPE
              NKTXT
              CALL              /INPUT NUM OF KNOTS
              IIN
              NKTS
              CALL
              LOAD
              NKTS
              DCA TMP0
/
              CLA
              TAD TMP0          /0   <NKTS <81?
              SPA SNA
              JMP I STP3
              CALL
              ADD1
              -120
              SMA SZA
              JMP I STP3
              CLA
              TAD TMP0          /GET KNOT SPACING
              DCA IOP
              CALL
              MOVE
              2
              XSS
              FOP
              CALL
              DLOAD
              XES
              JMS I FFSUB
              JMS I FIDIV
              CALL
              DSTOPE
              XINC
/
              CALL              /XINC °5   IN?
              DLOAD
              XINC
              JMS I FABS
              CALL
              DSTOPE
              FOP
              JMP I .+1
              SETUP9
STP3,         SETUP3
/
/
/
SETUP9,       CALL
              DLOAD
              XSCL
              JMS I FSHR
              JMS I FFSUB
              SPA
              JMP SETUP3
/
              CALL
              TYPE
              VZTXT
              CALL              /INPUT Z SEEK VEL
```

```
            FIN
            VZS
/
            CALL
            TYPE
            VYTXT
            CALL           /INPUT Y SEE VEL
            FIN
            VYS
            CALL
            TYPE
            VHTXT
            CALL           /INPUT VHD
            FIN
            VHD
/
            DLD            /VHDSQ = VHD*VHD
            VHD
            DST
            FOP
            JSR I FFMUY
            DST
            VHDSQ
/
            CALL           /RETURN TO MAIN PROG
            MAINP
/
SETUP3,     CALL
            CLRB
            CALL
            ALPHA
            BVTXT
            CALL
            PRINT
/
            JMP I  .+1
            SETUP2
/
SPTXT,      2324           /'START POSITION: '
            0122
            2440
            2017
            2311
            2411
            1716
            7240
            0000
/
SSTXT,      2324           /'START OF SEAM: '
            0122
            2440
            1706
            4023
            0501
            1572
            4000
ESTXT,      0516           /'END OF SEAM: '
            0440
            1706
            4023
            0501
            1572
            4000
RPTXT,      2205           /'RETRACT POSITION: '
            2422
            0103
            2440
```

```
                2017
                2311
                2411
                1716
                7240
                0000
NKTXT,          4340            /'# OF KNOTS: '
                1706
                4013
                1617
                2423
                7240
                0000
BVTXT,          0201            /'BAD INPUT VALUE '
                0240
                1116
                2025
                2440
                2601
                1425
                0500
VZTXT,          3240            /'Z SEEK VELOCITY: '
                2305
                0513
                4026
                0514
                1703
                1124
                3172
                4000
VYTXT,          3140            /'Y SEEK VELOCITY: '
                2305
                0513
                4026
                0514
                1703
                1124
                3172
                4000
VHTXT,          2422            /'TRACE VELOCITY:'
                0105
                0540
                2605
                1417
                0311
                2431
                7240
                0000
SPEED,          1               /READ SPEED FROM TTY
                CLA
                TAD I CALL0     /SAVE RETURN ADDR
                DCA SPEED3
                TAD ARG0        /SAVE ARGUMENT
                DCA SPEED2
                CALL
                IIN
                SPEED4
                CAM
                TAD I50         /SCALE TTY INPUT
                DCA IOP
                TAD SPEED4
                JMS I FIDIV
                SZA
                SKP
                IAC
                DCA I SPEED2
```

```
                JMP I SPEED3    /RETURN
SPEED2,         0
SPEED3,         0
SPEED4,         0
/
/
TYPE,           1               /PRINT TEXT
                CLA
                TAD I CALL0     /SAVE RETURN ADDR
                DCA TEXT2
                TAD ARG0        /GET TEXT ADDR
                DCA TEXT1
/
                CALL
                CLRB
                CALL
                CRLF
                CALL
                ALPHA
TEXT1,          0
                CALL
                PRINT
                CALL
                READ
                JMP I TEXT2     /RETURN
TEXT2,          0
/
/
AXTXT,          0130            /'AXIS CODE:'
                1123
                4003
                1704
                0572
                4000
/
/
RCORD,          NOP             /RECORD SEAM
                CAM             /CLEAR TOTAL RECORD TIME
                DST
                RCSUM
/
                CALL            /SET KNOT POINTER AND COUNT
                LOAD1
                KLIST+24
                CALL
                STORE
                RCORD1
                CALL
                LOAD
                NKTS
                CIA
                CALL
                STORE
                RCORD2
                CALL
                MOVE
                XSS
                XKNOT
/
                CALL            /START SAMPLING
                INCLD
                ADIN
                CALL
                INCLD
                DAOUT
                CALL
                INCLD
```

```
        EMFLG
        CLA
        DCA   SFLG
        CALL
        INCLD
        STEST
        CALL
        CLKSRT
/
        CALL
        WAIT
/
        CALL              /SET OUTPUTS
        MOVE
        12
        XXI
        XXO
/
        CALL
        WAIT
/
        CALL              /POSITION CONTROL ALL AXES
        COMP0
        JMS I DELAY
        CALL
        CCIN
        0037
        0037
        JMS I DELAY
/
        CALL              /TO START POSITION
        PTOP
        XXI
        XSP
        COEFS
        DS
/
        CALL
        SPLINE
        COEFS
        DS
/
        CALL              /TO START OF SEAM
        PTOP
        XXI
        XSS
        COEFS
        DS
/
        CALL
        SPLINE
        COEFS
        DS
/
        CALL              /SEEK SEAM IN Z
        INCLD
        RCAD
        CALL
        INCLD
        SLOPE
        CALL
        WAIT
/
        CALL
        CCOUT
        DLD               /Z SEEK VELOCITY
        VZS
```

```
                DST
                ZZO
                CALL
                CCIN            /Z VELOCITY
                0033            /X,Y,T,P POSITION
                0037
        /       JMS I DELAY
RCDC1,          CALL
                WAIT
                DLD             /Z AT NULL
                EZ
                DST             /EZ < VZS?
                FOP
                DLD
                VZS
                JMS I FSUB
                SPA
                JMP RCDC1       /NOT ALL NULL
        /
                CLA             /DELAY 56 MSEC
                TAD IM7
                DCA RCDC2

RCDC7,          JMS RCDC3       /CONTROL Z
                CALL
                WAIT
                ISZ RCDC2
                JMP RCDC7
                CALL            /SEEK SEAM IN Y
                CCOUT
                DLD             /Y SEEK VELOCITY
                VYS
                DST
                YYO
                CALL
                CCIN            /Y, Z VELOCITY
                0023            /X,T,P POSITION
                0037
                JMS I DELAY
        /
RCDC5,          JMS RCDC3       /CONTROL Z
                CALL
                WAIT
                DLD             /Y AT NULL?
                EY
                DST             /EY < VYS?
                FOP
                DLD
                VYS
                CALL            /VELOCITY CONTROL ALL AXES
                CCIN
                0000
                0037
                JMS I DELAY
                CALL            /INCLUDE VELOCITY CONTROL
                INCLD
                TCTRL
        /
                CALL            /STORE NEW START OF SEAM
                MOVE
                12
                XXI
                XSS
        /
                CALL
                BOUNDR
```

```
              XSS
              KLIST
/
PCORD8,       CALL                  /INCREMENT KNOT
              MOVE
              2
              XINC
              FOP
              CALL
              DLOAD
              XKNOT
              JMS I FFADD
              CALL
              DSTOPE
              XKNOT

/
              CALL                  /RECORD NEXT KNOT
              KNOT
RCORD1,       KLIST+24
/
              CLA
              TAD RCORD1            /INC POINTER
              CALL
              ADD1
              24
              DCA RCORD1
/
              TAD RCTIME
              MQL
              DAD
              RCSUM
              DST
              RCSUM
              ISZ RCORD2
              JMP RCORD8
/
              CALL
              LOAD
              NKTS
              DCA IOP
              DLD
              RCSUM
              JMS I FIDIV
              SWP
              DCA           RCTIME
/
RCOR10        CALL
              WAIT
/
              DLD                   /X > XFINAL
              XXI
              DST
              FOP
              DLD
              XES
              JMS I FFSUB
              SPA
              JMP RCOR10
              JMP RCOR9
              JMP I FFSUB
              SPA
              JMP RCDC5             /NOT AT NULL
/
              CLA                   /DELAY 104 MSEC
              TAD IM13
              DCA RCDC2
```

```
RCDC6,      JSR RCDC3       /CONTROL Z
            JSR RCDC4       /CONTROL Y
            CALL
            WAIT
            ISZ RCDC2
            JMP RCDC6
            CALL
            CCOUT
            CAM             /ZERO, X,T,P COMMANDS
            DST
            XXO
            DST
            TTO
            DST
            PPO
RCDC2,      0               /DELAY COUNT
/
RCDC3,      0               /CONTROL Z VELOCITY
            DLD             /COMMAND = EZ
            EZ
            DST
            ZZO
            JMP I RCDC3
/
RCDC4,      0               /CONTROL Y VELOCITY
            DLD             /COMMAND = EY
            EY
            DST
            YYO
            JMP I RCDC4
RCORD2,     0
RCORD9,     CALL            /STORE NEW END OF SEAM
            MOVE
            12
            XXI
            XES
/
            CALL
            CCOUT
            CALL
            EXCLD
            RCAD
            CALL
            EXCLD
            TCTRL
            CALL
            EXCLD
            SLOPE
/
            CALL            /SET OUTPUTS
            MOVE
            12
            XXI
            XXO
            CALL
            WAIT
/
            CALL            /POSITION CONTROL ALL AXES
            CCIN
            0037
            0037
            JMS I DELAY
/
            CALL            /TO RETRACT POSITION
            PTOP
            XXI
```

```
                XRP
                COEFS
                DS
/
                CALL
                SPLINE
                COEFS
                DS
/
                CALL            /RELEASE CONTROL
                CCOUT
/
                CALL            /STOP SAMPLING
                CLKSTP
                CALL
                EXCLD
                ADIN
                CALL

EXCLD
                DAOUT
                CALL
                EXCLD
                EMFLG
                CALL
                EXCLD
                STEST
/
                CALL            /RETURN TO MAIN PROG
                MAINP
/
RCSUM,          0
                0
/
BOUNDR,         2               /BOUNDARY PTS AND SLPS
                CLA
                TAD IM5         /COUNT Δ -5
                DCA BOUN9
                STA
                TAD ARG0        /INITIALIZE XSS
                DCA IX1
                STA
                TAD ARG1        /INITIALIZE KNOT ADDR°
                DCA IX4
BOUN1,          TAD I IX1
                MQL
                TAD I IX1
                JMS I BOUN3     /STORE POINT
                CAM
                JMS I BOUN3     /STORE SLOPE
                ISZ BOUN9       /DO 5 TIMES
                JMP BOUN1
                RETURN
BOUN3,          KNOT16          /STORE KNOT SUBROUTINE
BOUN9,          0
/
PBTEST,         NOP             /PLAY BACK TEST
                CALL
                INCLD
                ADIN
                CALL
                INCLD
                DAOUT
                CALL
                INCLD
                EMFLG
                CALL
```

```
          CLKSRT
          CALL              /PRINT 'START POS'
          TYPE
          SPTXT
          CALL              /WAIT FOR CR
          CLRB
          CALL              /STORE ST POS'
          MOVE
          12
          XXI
          XSP
/
          CALL              /PRINT 'RETRACT POS'
          TYPE
          RPTXT
          CALL              /WAIT FOR CR
          CLRB
          CALL              /STORE RP
          MOVE
          12
          XXI
          XRP
/
          CALL              /PRINT 'AXIS CODE'
          TYPE
          AXTXT
          CALL              /TTY INPUT
          IIN
          TEST2
/
/         JMS WCLK          /WAIT TILL BEGINNING OF CLR CYCLE
/
          CALL              /DAC = ADC
          MOVE
          12
          XXI
          XXO
/
          CALL              /CLOSE RELAY; ENABLE COMP CONTROL
          CCIN
          0037
TEST2,    0
TEST1,    CALL              /PRINT 'PB SPEED'
          EXCLD
          STEST
/
          CALL
          TYPE
          PDTXT
          CALL              /ENTER SPEED
          SPEED
          PTOP10
/
          JMS WCLK          /WAIT CLK
/
          CALL              /MOVE TO XSP
          PTOP
          XXI
          XSP
          COEFS
          DS
          CALL
          SPLINE
          COEFS
          DS
/
          CALL
```

```
                EXCLD
                STEST
/
                CALL            /PRINT 'PB SPEED'
                TYPE
                PDTXT
                CALL
                SPEED
                PTOP10
/
                JMS WCLK        /WAIT CLK
/
                CALL
                PTOP
                XXI
                XSP
                COEFS
                DS
                CALL
                SPLINE
                COEFS
                DS
/
                CALL
                EXCLD
                STEST
/
                CALL            /PRINT 'COMMAND'
                TYPE
                CMTXT
                CALL
                MATCH
                RDTXT
                PBTEST
                JMP TEST1
/
WCLK,           0
                CLA
                DCA SFLG
                CALL
                INCLD
                STEST
                CALL
                WAIT
                JMP I WCLK
/
/
PBACK,          CLA             /PLAYBACK LOOP
                CALL            /PRINT 'WANT TO WELD'
                TYPE
                WTXT
                CALL            /CHECK FOR 'NO'
                MATCH
                NOTXT
                PBACK7
                CALL            /CHECK FOR 'YES'
                MATCH
                YSTXT1
                PBACK8
                JMP PBACK
PBACK7,         CALL            /NO WELD OPTION
                CLRB
                CALL
                ALPHA
                NWTXT
                CALL
```

```
                PRINT
                CLA
                TAD PBCK13
                DCA PBCK10
                JMP PBCK11
PBACK8,         CALL                    /WELD OPTION
                CLRB
                CALL
                ALPHA
                YWTXT
                CALL
                PRINT
                CLA
                TAD PBCK14
                DCA PBCK10
PBCK11,         CALL
                TYPE
                PDTXT
                CALL
                SPEED
                KTOK10
/               CALL                    /PRINT 'DESIRE REPEAT CYCLE'
                TYPE
                PBTXT1
                CALL                    /CHECK FOR NO
                MATCH
                NOTXT
                PBCK15
                CALL                    /CHECK FOR YES
                MATCH
                YSTXT1
                PBCK16
PBCK15,         STA                     /REPEAT NOT DESIRED
                DCA RPFLG               /REPEAT FLAG = -1
                JMP PBCK12
PBCK16,         CLA                     /REPEAT DESIRED
                DCA RPFLG               /REPEAT FLAG = 0
PBCK12,         JMS I READY
/
                CALL                    /START SAMPLING
                INCLD
                ADIN
                CALL
                INCLD
                DAOUT
                CALL
                INCLD
                EMFLG
                CLA
                DCA SFLG
                CALL
                INCLD
                STEST
                CALL
                CLKSRT
                CALL
                WAIT
/
                CALL                    /SET OUTPUTS
                MOVE
                12
                XXI
                XXO
/
                CALL
                WAIT
/
```

```
              CALL              /COMPUTER CONTROL
              COMPO
              JMS I DELAY
              CALL
              CCIN
              0037
              0037
              0
PBACK5,       CALL              /TO START POSITION
              PTOP
              XXI
              XSP
              COEFS
              DS
/
              CALL
              SPLINE
              COEFS
              DS
/
              CALL
              PTOP              /TO START OF SEAM
              XXI
              XSS
              COEFS
              DS
/
              CALL
              SPLINE
              COEFS
              DS
/
              CALL              /SET COUNT AND POINTERS
              LOAD
              NKTS
              CIA
              JMP     .+1
              DETOUR
RETOUR,       CALL
              LOAD1
              KLIST+24
              CALL
              STORE
              PBACK2+1
/
/
              JMP I .+1
PBCK10,       PBACK3
PBCK13,       PBACK3
PBCK14,       PBACK4
/
              PAGE
/
PBACK4,       CALL              /WELD SEAM
              COMP1
/
PBACK3,       CALL
              KTOK              /CALCULATE COEFS
PBACK2,       XSS
              KLIST
              COEFS
              DS
/
              CALL              /MOVE ONE KNOT
              SPLINE
              COEFS
              DS
/
```

```
                CLA
                TAD PBACK2+1      /INC POINTERS
                DCA PBACK2
                TAD PBACK2+1
                TAD I20PB
                DCA PBACK2+1
/
                ISZ PBACK1
                JMP PBACK3
/
/
                CALL              /NO WELD
                COMP0
/
                CALL              /TO RETRACT POSITION
                PTOP
                XXI
                XRP
                COEFS
                DS
/
                CALL
                SPLINE
                COEFS
                DS
/
/
PBACK6,         CALL              /RELEASE CONTROL
                CCOUT
                CALL              /STOP SAMPLING
                CLKSTP
                CALL
                EXCLD
                ADIN
                CALL
                EXCLD
                DAOUT
                CALL
                EXCLD
                STEST
                CALL
                DONE1
                CLA
                TAD RPFLG
                SZA CLA
                JMP .+3
                JMP I .+1
                PBCK12
/
                CALL              /RETURN TOMAINPROG
                MAINP
/
PBACK1,         0
/
PDTXT,          2014
                0131
                0201
                0313
                4023
                2005
                0504
                4050
                1120
                1551
                7240
                0000
```

```
DNTXT,      2205
            0104
            3172
            0000
I20PB,      24
WTXT,       2705                /WANT TO WELD?
            1404
            7700
            0000
NUTXT,      1617
            0000
YSTXT1,     3105                /YES
            2300
NWTXT,      1617                /NO WELD
            4027
            0514
            0400
YWTXT,      2705                /WELD
            1404
            0000
DELAY1,     0                   /SOFTWARE DELAY
            CLA
            TAD IM50
            DCA DELAY2
            NOP
            NOP                 ≈ 477 uS
            ISZ DELAY2
            JMP .-3
            JMP I DELAY1
DELAY2,     0

RPTXT,      0405
            2311
            2205
            4022
            0520
            0501
            2440
            0331
            0314
            0577
            4000
/
/
DETOUR,     CALL                /MODIFICATION TO
            STORE               /EXTEND PAGE
            PBACK1
            CALL
            LOAD1
            KLIST
            CALL
            STORE
            PBACK2
            JMP I .+1
            RETOUR
/
/
/SPLINE SYSTEM VARIABLES
/
MAXV,       0                   /MAX VELOCITY
MAXA,       0                   /MAX ACCELERATION
/
VSCL,       12                  /10V INTERFACE
/
XSCL,       0                   /AXIS SCALING
            0
YSCL,       0;      0
ZSCL,       0;      0
```

```
TSCL,      0;   0
PSCL,      0;   0
/
XGAIN,     0            /AXIS GAINS
           0
YGAIN,     0;   0
ZGAIN,     0;   0
TGAIN,     0;   0
PGAIN,     0;   0
/
NKTS,      0            /KNOT COUNT
/
XXI,       0            /INPUT POSITION
           0
*.+10
/
DXI,       0            /INPUT SLOPE
           0
*.+10
/
DELT,      0            /TIMER
           0
/
XXO,       0            /OUTPUT POSITION
           0
*.+10
/
XSP,       0            /START POSITION
           0
*.+10
/
XSS,       0            /START OF SEAM
           0
*.+10
           0
           0
           0;   0;   0;   0;   0;   0;   0;   0
/
/
           0
           0
/
XES,       0            /END OF SEAM
           0
*.+10
/
           0
           0
           0;   0;   0;   0;   0;   0;   0;   0
/
           0
           0
/
XRP,       0            /RETRACT POSITION
           0
*.+10
/
XINC,      0            /INCREMENT BETWEEN KNOTS
           0
/
XKNOT,     0            /NEXT KNOT LOCATION
           0
/
RSPD,      0            /RECORD SPEED
/
PSPD,      0            /PLAYBACK SPEED
           0
/
```

```
COEFS,      0                   /SPINE COEFFICIENTS
            0
*.+56
/
DS,         0                   /SPLINE INCREMENT
            0
/
EY,         0                   /PROBE ERRORS
            0
EZ,         0
            0
VY,         0                   /VELOCITIES
            0
VZ,         0
            0
COST,       0                   /COS(T)
            0
SINT,       0                   /SIN(T)
            0
COSP,       0                   /COS(P)
            0
SINP,       0                   /SIN(P)
            0
/
VYS,        0                   /SEAM SEEK VELOCITIES
            0
VZS,        0
            0
VHD,        0                   /HORIZONTAL VELOCITY
            0
VHDSQ,      0                   /VHD**2
            0
/END = FLF + ADDA + KNOT + PTOP + KTOK + FIXL + END
/
ADCX=I0
ADCY=I1
ADCZ=I2
ADCT=I3
ADCP=I4
YYI=XXI+2
ZZI=XXI+4
TTI=XXI+6
PPI=XXI+10
YYO=XXO+2
ZZO=XXO+4
TTO=XXO+6
PPO=XXO+1
/
ADCEY=I5
ADCEZ=I6
ADCVY=I7
ADCVZ=I8
ADCST=I9
ADCCT=I10
ADCSP=I11
ADCCP=I12
/KNOT = KNOT + SL01 + SLOPE1
/
/
/FLOAT FRACTION IN AM INTO FLOATING-PT FORMAT
/
NMI=7411
SCA=7641
FLF1,       0
            NMI                 /NORMALIZE
            DCA FLF5
            SWP
```

```
                AND MASK6C
                DCA FLF6
                SCA                 /GET EXPONENT
                CIA
                AND MASK6
                TAD FLF6
                MQL
                TAD FLF5
                JMP I FLF1
FLF5,           0
FLF6,           0
/
/
/FLOATING-PT IN AM DIVIDED BY FLOATING-PT IN FOP
/
FLDFL1          0
                DST
                FLDFL5
                SWP                 /GET EXPOMENT
                AND MASK6
                JMS FLDFL3
                DCA FLDFL6
                TAD FLDFL5
                AND MASK6C
                DCA FLDFL5
                DCA SIGN1           /INITIALIZE SIGN
/
                TAD FOP+1
                SMA
                JMP .+3
                JMS FLDFL2
                CIA
                DCA IOP
                TAD FOP
                AND MASK6
                JMS FLDFL3
                CIA
                DCA FLDFL7
                DLD
                FLDFL5
                JMS I FIDIV
                NMI
                SWP
                AND MASK6C
                DCA FLDFL5
                SCA
                CIA
                TAD I11
                TAD FLDFL6
                TAD FLDFL7
                AND MASK6
                DCA FLDFL8
                TAD FLDFL5
                SWP
                DST
                FLDFL5
                CLA
                TAD SIGN1
                SNA CLA
                JMP .+10
                DLD
                FLDFL5
                DCM
                SWP
                TAD FLDFL8
                SWP
```

```
                JMP I FLDFL1
                DLD
                FLDFL5
                SWP
                TAD FLDFL8
                SWP
                JMP I FLDFL1
FLDFL2,         0
                DCA FLDFL8
                TAD SIGN1
                CMA
                DCA SIGN1
                TAD FLDFL8
                JMP I FLDFL2
FLDFL3,         0                       /COMPLEMENT EXPONENT
                DCA FLDFL8
/
                TAD FLDFL8
                AND FLDFL9
                SNA CLA
                JMP .+4
                TAD FLDFL8
                TAD MASK6C
                JMP I FLDFL3
                TAD FLDFL8
                JMP I FLDFL3
SIGN1,          0
FLDFL5,         0
                0
FLDFL6,         0                       /EXPONENT OF NUMERATOR
FLDFL7,         0                       /EXPONENT OF DENOMINATOR
FLDFL8,         0
FLDFL9,         40
/
                D/A OUTPUT FUNCTION
/
DA01,           CLA CLL
                DLD                     /OUTPUT X
                XXO
                SHL
                6
                DACX
/
                DLD                     /OUTPUT Y
                YYO
                SHL
                6
                DACY
/
                DLD                     /OUTPUT Z
                ZZO
                SHL
                6
                DACZ
/
                DLD                     /OUTPUT T
                TTO
                SHL
                6
                DACT
/
                DLD                     /OUTPUT P
                PPO
                SHL
                6
                DACP
/
```

```
                JMP I EXIT         /EXIT FROM TASK
/               A/D INPUT FUNCTION
/
ADO1,           CLA CLL
                CAM
                TAD ADCX           /INPUT X
                JMS ADO2
                DST
                XX1
/
                CAM
                TAD ADCY           /INPUT Y
                JMS ADO2
                DST
                YY1
/
                CAM
                TAD ADCZ           /INPUT Z
                JMS ADO2
                DST
                ZZ1
/
                CAM
                TAD ADCT           /INPUT T
                JMS ADO2
                DST
                TT1
/
                CAM
                TAD ADCP           /INPUT P
                JMS ADO2
                DST
                PP1
/
                JMP I EXIT         /EXIT FROM TASK
/
ADO2,           0                  /DOUBLE ADO INPUT
                DCA ADO3
                TAD ADO3
                ADCONV
                SKADC
                JMP .-1
                CLA
                TAD ADO3
                ADCONV
                SKADC
                JMP .-1
                ADCIN
                ASR
                6
                JMP I ADO2
ADO3,           0
/
/
/               A/D                INPUTS FOR TRACE (RECORD MODE)
/
RCAD1,          CLA   CLL
                CAM
                TAD ADCEY          /INPUT EY
                JMS AD02
                DST
                EY
/
                CAM
                TAD   ADCEZ        /INPUT EZ
```

```
            JMS   AD02
            DST
            EZ
/
            CAM
            TAD   ADCVY         /INPUT VY
            JMS   AD02
            DST
            VY
/
            CAM
            TAD   ADCVZ         /INPUT VZ
            JMS   AD02
            DST
            VZ
/
            CAM                 /INPUT SIN(T)
            TAD   ADCST
            JMS   AD02
            DST
            SINT
/
            CAM
            TAD   ADCCT         /INPUT COS(T)
            JMS   AD02
            DST
            COST
/
            CAM
            TAD   ADCSP         /INPUT SIN(P)
            JMS   AD02
            DST
            SINP
/
            CAM
            TAD   ADCCP         /INPUT COS(P)
            JMS   AD02
            DST
            COSP
/
            JMP   I  EXIT
/
            RECORD KNOT AND CALC. SLOPE
/
KNOT,       1
            CLA
            DCA   RCTIME        /CLEAR RCORD TIME COUNT
            STA
            TAD   ARG0          /GET KNOT POINTER
            DCA   IX4
            TAD   I CALL0       /SAVE RETURN ADDR°
            DCA   KNOT15
            STA
            TAD   KNOT2         /INITIALIZE A/D INPUT ADDR°
            DCA   IX5
            TAD   KNOT8
            DCA   KNOT6
            TAD   IM5           /COUNT = -5
            DCA   KNOT7
KNOT3,      DLD                 /XKNOT-XXI-DF * 0
            DF
            DAD
            XXI
            DCM
            DAD
            XKNOT
            SPA
```

```
                JMP KNOT1
                DPSZ
                SKP
                JMP KNOT1
/
                ISZ RCTIME
                NOP
                CALL
                WAIT
                JMP KNOT3
/
KNOT1,          CLA                 /RECORD KNOT
                TAD I IX5           /GET A/D INPUT
                MQL
                TAD I IX5
                JMS KNOT16          /STORE INTO -LIST
                TAD I KNOT6
                ISZ KNOT6
                DCA KNOT4
                CALL
                SLOPE1
KNOT4,          0
                TMP0
                DLD
                TMP0
                NOP
                JMS KNOT16          /STORE SLOPE
                ISZ KNOT7
                JMP KNOT1
                CAM
                TAD RCTIME          /CALC. RCORD TIME IN MS
                SHL
                3
                DCA RCTIME
/
                CALL
                WAIT
                JMP I KNOT15        /RETURN
/
KNOT16,         0                   /STORE INTO KLIST
                DF1
                SWP
                DCA I IX4
                SWP
                DCA I IX4
                DF0
                JMP I KNOT16
/
DF,             200
                0
KNOT2,          XXI
KNOT15,         0
KNOT6,          0
KNOT7,          0
KNOT8,          KNOT9
KNOT9,          SLPX
                SLPY
                SLPZ
                SLPT
                SLPP
/                       UPDATA DATA POINT LIST FOR SLOPE CALC.
/
SLP01,          CLA CLL
                TAD SLP07           /INITIALIZE A/D INPUT POINTER
                DCA SLP10
                TAD SLP05           /INITIALIZE DIMENSION POINTER
                DCA SLP08
```

```
                TAD IM5         /INITIALIZE  5 COUNT
SLP02,          CLA
                TAD IM16S
                DCA TMP1
                TAD I SLP08     /OLD LIST POINTER
                ISZ SLP08
                DCA SLP11
                TAD SLP11       /NEW LIST POINTER
                TAD 12
                DCA SLP12
SLP03,          TAD I SLP12     /OLD LIST = NEW LIST
                ISZ SLP12
                DCA I SLP11
                ISZ SLP11
                ISZ TMP1
                JMP SLP03
                CLA             /MOVE NEW A/D INPUT INTO LIST
                TAD I SLP10
                ISZ SLP10
                DCA I SLP11
                ISZ SLP11
                TAD I SLP10
                ISZ SLP10
                DCA I SLP11
                ISZ SLP11
                TAD I SLP10
                ISZ SLP10
                DCA I SLP11
                ISZ SLP11
                ISZ TMP0        /DO 5 TIMES
                JMP SLP02
                JMP I EXIT
SLP05,          SLP06
SLP06,          SLPX
                SLPY
                SLPZ
                SLPT
                SLPP
SLP07,          XXI
IM16S,          -20
SLP08,          0
SLP10,          0
SLP11,          0
SLP12,          0
/SLOPE CALCULATION
/
SLPE1,          2
                STA
                TAD ARG0
                DCA IX0
                STA
                TAD ARG1
                DCA IX2
                JMS SLOPE5      /DVDT Δ(-4V(-4)-3V(-3)-2V(-2)-V(-1)
                JMS I FSHL      /      +V(1)+2V(2)+3V(3)+4V(4))/(60*DT
                JMS I FSHL
                DST
                FOP
                JMS SLOPE5
                DST
                TMP2
                JMS I FSHL
                JMS I FFADD
                DST
                FOP
```

```
            DLD
            TMP2
            JMS I FFADD
            DST
            FOP
            JMS SLOPE5
            JMS I FSHL
            JMS I FFADD
            DST
            FOP
            JMS SLOPE5
            JMS I FFADD
            DCM
            DST
            FOP
            JMS SLOPE5         /IGNORE CENTER POINT
            JMS SLOPE5
            JMS I FFADD
            DST
            FOP
            JMS SLOPE5
            JMS I FSHL
            JMS I FFADD
            DST
            FOP
            JMS SLOPE5
            DST
            TMP2
            JMS I FFADD
            DST
            FOP
            DLD
            TMP2
            JMS I FSHL
/
            JMS I FFADD
            DST
            FOP
            JMS SLOPE5
            JMS I FSHL
            JMS I FSHL
            JMS I FFADD
            DCA TMP2
            TAD IS60
            DCA IOP
            TAD TMP2
            JMP I FIDIV
            DCA TMP2
            TAD PERIOD
            DCA IOP
            TAD TMP2
            JMS I FIDIV
/
            SWP
            DCA I IX2          /STORE SLOPE
            SWP
            DCA I IX2
            RETURN
/
SLOPE5,     0
            CLA
            TAD I IX0          /GET NEXT SAMPLE
            MQL
            TAD I IX0
            JMP I SLOPE5
IS60,       74
/ZERO END SLOPES, PT TO PT SLINE FIT
/C3 = 2*X0 -2*X1
```

```
/C2 = -3*X0 + 3*X1
/C1 = 0
/C0 = X0
PTOP,          4
               TAD IM5
               DCA PTOP9
               STA
               TAD ARG0          /STARTING POINT
               DCA IX0
               STA
               TAD ARG1          /END POINT
               DCA IX1
               STA
               TAD ARG2          /COEF
               DCA IX2
               STA
               TAD ARG3          /DS
               DCA IX3
PTOP1,         TAD PTOP10        /GET SPEED
               DCA IOP
               TAD IM5
               DCA TMP0
               DLD               /MAX Δ .004 SEC.
               MAX1
               DST
               MAX
PTOP4,         CLA
               TAD I IX0         /GET STARTING PT.
               DCA FOP
               TAD I IX0
               DCA FOP+1
               TAD I IX1         /GET END PT.
               MQL
               TAD I IX1
               JMS I FFSUB       /DELX = X1 - X0
               JMS I FABS
               DST
               TMP2
               DCM
               DAD
               MAX
               SMA               /CALC. ABS(DELX)-MAX
               JMP .+5
               DLD
               TMP2
               DST
               MAX               /MAX Δ ABS(DELX)
               ISZ TMP0
               JMP PTOP4
               DLD
               MAX
/              JMS I FIDIV       /DELT = ABS(DELX)/SPEED
               JMS I FLF         /FLOAT
               SWP               /SCALED BY 2 *12
               TAD I11
               AND MASK6
               SWP
               DST
               FOP
               DLD               /DS = 4 MSEC/DELT
               DT1
               JMS I FLDFL
               JMS I FIXF
               SWP
               DCA I IX3
               SWP
```

```
                DCA I IX3
                STA
                TAD ARG0        /GET X0, X1 POINTER
                DCA IX0
                STA
                TAD ARG1
                DCA IX1
PTOP3,          TAD I IX0       /CALC. FOR NEXT AXIS
                DCA PTOP5
                TAD I IX0
                DCA PTOP6
/
/
                TAD I IX1
                DCA PTOP7
                TAD I IX1
                DCA PTOP8
                JMP PTOP2
PTOP2,          DLD             /GET X1
                PTOP7
                DCM
                DAD
                PTOP5
                DST
                TMP0
                SHL
                1
                SWP
                DCA I IX2
                SWP             /C3 = 2(X0-X1)
                DCA I IX2
                DLD
                TMP0
                SHL
                1
                DAD
                TMP
                DCM
                SWP
                DCA I IX2       /C2 = -3(X0-X1)
                SWP
                DCA I IX2
                DCA I IX2       /C1 = 0
                DCA I IX2
                TAD PTOP5       /C0 = X0
                DCA I IX2
                TAD PTOP6
                DCA I IX2
                ISZ PTOP9
                JMP PTOP3
                RETURN
/
PTOP5,          0
PTOP6,          0
PTOP7,          0
PTOP8,          0
PTOP9,          0
PTOP10,         4               /SPEED = 2 BITS/SEC
DT1,            4471            /.004 SEC IN FLOATING-PT.
                2030
MAX1,           3050
                0020
MAX,            0
                0
/
/KNOT TO KNOT 3RD ORDER SPLINE FIT
/
/C3= 2*X(0)-2*X(1)+DXDS(0)+DXDX(1)
```

```
/C2=-3*X(0)+3*X(1)-2*DXDS(0)-DXDS(1)
/C1=DXDS(0)
/C0=X(0)
/
KTOK,           4
                CLA
                TAD IM5
                DCA KTOK9
                STA
                TAD ARG0
                DCA IX0
                STA                 /END POINT & SLOPE
                TAD ARG1
                DCA IX1
                STA                 /COEFS
                TAD ARG2
                DCA IX2
                STA                 /DS
                TAD ARG3
                DCA IX3
KTOK1,          TAD KTOK10          /GET SPEED
                DCA IOP             /SPEED IN IOP
                JMS I KTOK4         /GET STARTING PT.
                DST
                FOP
                JMS I KTOK5         /GET END PT. & SLOPE
                JMS I FFSUB         /DELX -X1-Xi[AM←(A,MQ-FOP)]
                JMS I FIDIV         /AM←AM/IOP
                DST
                DELT1
                JMS I FABS          /ABS. OF FRAC IN AM
                JMS I FLF           /FLOAT
                SWP                 /SCALED BY 2**12
                                      BY ADDING 12 TO EXPONENT)
                TAD I12             /ADD DECIMAL 12
                AND MASK6           /TAKE ONLY LOWER 6 BITS (i.e.,
                                      EXPONENT)
                SWP
                DST
                FOP                 /FOP = DELT1*$2^{12}$
                DLD
                DT2
                JMS I FLDFL         /DT2/FOP→AM
                JMS I FIXF          /FIX TO INTEGER
                SWP
                DCA I IX3           /STORE DS
                SWP
                DCA I IX3
                TAD IX0             /BACK UP POINTER
                TAD IM2
                DCA IX0
                TAD IX1
                TAD IM2
                DCA IX1
KTOK2,          JMS I KTOK4         /GET X(0)
                DST
                TMP0
                JMS I KTOK5         /GET X(1)
                DST
                TMP2
                JMS I KTOK4         /GET DXDT(0)
                DST
                TMP4
                JMS I KTOK5         /GET DXDT(1)
                DST
                TMP6
/
```

/CALCULATE DXDS(0) & DXDS(1)
/
```
                CLA
                TAD RCTIME      /GET DT/DS = R
                DCA IOP
                DLD             /DXDS(0) = DXDT(0)*DELT
                TMP4
                JMS I FIMUY
                DST
                TMP4
                DLD             /DXDS(1) = DXDT(1)*DELT
                TMP6
                JMS I FIMUY
                DST
                TMP6
                DLD             /C3 = 2X(0)-2X(1)+DXDS(0) DXDS(1)
                TMP2
                DCM
                DAD
                TMP0
                SHL
                1
                DAD
                TMP4
                DAD
                TMP6
                JMS I KTOK6     /STORE C3
                TAD I3
                DCA IOP
                DLD             /C2 = -3X(0)+3X(1)-2DXDS(0)-DXDS(1
                TMP0
                DCM
                DAD
                TMP2
                JMS I FIMUY
                DCM
                DAD
                TMP4
                DAD
                TMP4
                DAD
                TMP6
                DCM
                JMS I KTOK6
                DLD             /C1 = DXDS(0)
                TMP4
                JMS I KTOK6
                DLD             /C0 = X(0)
                TMP0
                JMS I KTOK6
                ISZ KTOK9       /DO 5 TIMES
                JMP KTOK2
                RETURN
KTOK4,          KTOK14
KTOK5,          KTOK15
KTOK6,          KTOK16
KTOK9,          0
KTOK10,         1               /ASSUMED SPEED
DELT1,          0
                0
DT2,            4471
                2030
/
/
KTOK14,         0               /GET STARTING PT. & SLOPE
                CLA CLL
                DF1
                TAD I IX0
```

```
                    MQL
                    TAD I IX0
                    DF0
                    JMP I KTOK14
/
KTOK15,             0                       /GET END PT. & SLOPE
                    CLA CLL
                    DF1
                    TAD I IX1
                    MQL
                    TAD I IX1
                    DF0
                    JMP I KTOK15
/
KTOK16,             0                       /STORE COEFS
                    SWP
                    DCA I IX2
                    SWP
                    DCA I IX2
                    JMP I KTOK16
/
/FIX POSITIVE FRACTION
/
FIXF1,              0
                    SPA
                    HLT                     /NEGATIVE, NOT PRESENTLY ALLOWED
                    JMS FIXF3
                    JMS I FIXF1
/
FIXF3,              0
                    DST
                    FIXF8
                    CLA CLL
                    SWP
                    AND MASK6
                    SHL
                    6
                    SMA
                    SKP
                    CIA
                    ASR
                    6
                    DCA FIXF5
                    TAD FIXF8               /LEFT OR RIGHT SHIFT
                    AND FIXF9
                    CLL RTR
                    RAR
                    TAD FIXF10
                    DCA FIXF4
                    DLD
                    FIXF8
                    SWP
                    AND MASK6C
                    SWP
FIXF4,              0
FIXF5,              0
                    JMP I FIXF3
FIXF8,              0
                    0
FIXF9,              40
FIXF10,             SHL
/
/CALC. SPLINE VALUE
/
/V = ((C3*S + C2)*S + (1)*S +C0
/
SPINE,              2
                    CLA
```

```
                TAD I CALL0     /SAVE RETURN ADDR.
                DCA SPL10
                TAD I ARG1      /GET DS
                ISZ ARG1
                MQL
                TAD I ARG1
                DST
                SPL11
                CAM
                DST
                S
SPL4,           STA             /GET COEFS ADDR
                TAD ARG0
                DCA IX0
SPL0,           CLA
                TAD IM5
                DCA TMP2
                TAD SPL9
                DCA IX1
SPL1,           DLD
                S
                DST
                FOP
                CLA
                TAD IM3
                DCA TMP3
                JMS SPL5        /GET COEF
SPL2,           JMS I FFMUY     /V = PRODUCT + C
                DST
                TMP0
                JMS SPL5
                DAD
                TMP0
                ISZ TMP3        /DO 3 TIMES
                JMP SPL2
                JMS SPL6        /OUTPUT TO DAC
                ISZ TMP2        /DO 5 TIMES
                JMP SPL1
                DLD             /S - S + DS
                SPL11
                DAD
                S
                DST
                S
                DAD             /S + DS OVERFLOW?
                SPL11
                SMA
                JMP SPL3
                CAM             /DONE
                JMP I SPL10     /RETURN
/
SPL3,           CAM
                CALL
                WAIT
                JMP SPL4
SPL5,           0               /GET COEF
                CLA
                TAD I IX0
                MQL
                TAD I IX0
                JMP I SPL5
SPL6,           0               /STORE INTO DAC OUTPUT CELLS
                SWP
                DCA I IX1
                SWP
                DCA I IX1
                JMP I SPL6
SPL9,           XX0-1
```

```
SPL10,         0
SPL11,         0             /DS
               0
S,             0             /-DS
               0
/
/
TCTRL,         DLD           /XO = VHDSQ - VZ*VZ
               VZ
               DST
               FOP
               JMS I FFMUY
               DST
               FOP
               DLD
               VHDSQ
               JMS I FFSUB
               DST
               XXO
/
               DLD           /YO = VY
               VY
               DST
               YYO
/
               DLD           /ZO = EZ*COS(P)
               EZ
               DST
               FOP
               DLD
               COSP
               JMS I FFMUY
               DST
               ZZO
/
               DLD           /TAN(T)/2 = SIN(T)/COS(T)/2
               COST
               DST
               FOP
               DLD
               SINT
               ASR
               1
               JMS I FFDIV
/
               DST           /TO = VY-2*VHD*TAN(T)/2
               FOP
               DLD
               VHD
               JMS I FFMUY
               SHL
               1
               DST
               FOP
               DLD
               VY
               JMS I FFADD
               DST
               TTO
/
               DLD           /PO = VZ-VHD*SIN(P)
               VHD
               DST
               FOP
               DLD
               SINP
               JMS I FFMUY
```

```
                DST
                FOP
                DLD
                VZ
                JMS  I FFSUB
                DST
                PPO
/
/               JMP  I EXIT
/
COMP0,          0                  /RESET COMP
                RSCOMP
                RETURN
/
/
CCIN,           2
                CLA
                TAD ARG0
                SELCTL
                CLA
                TAD ARG1
                SELECT
                RETURN
/
COMP1,          0
                SCOMP
                RETURN
/
SLPX,           0
/
/
SLPY=SLPX+22
SLPZ=SLPX+44
SLPT=SLPX+66
SLPP=SLPX+110
CALL=JMS 1 CALL0
RETURN=JMP I RIN0

```

I claim:

1. An automatic mechanical working apparatus having a first means mounted for multi-dimensional movement relative to a second means within a defined work area for following a geometric curve in space having at least one portion with a progressively changing slope and having means to support said second means within the apparatus with a curved work path corresponding to said geometric curve and said second means being adapted to be worked on by said first means during relative movement between said first and second means, comprising a tracer means coupled to the first means for corresponding progressive and continuous movement along said work path and producing an output signal during such movement, a computer means connected to said tracer means and having sampling and digitizing means for developing input signals as said tracer means moves through said work path, said computer means including a program memory including a drive program including coordinate definition for direction of movement of the first means at a plurality of point locations with respect to said path including a start location and a finish location of said curved work path in space within the work area of said apparatus and a plurality of spaced point coordinate location between said start and finish locations, said memory including a self-programming dynamic trace-record program means responsive to said input signals of the moving tracer means to cause said tracer means to follow said path with the tracer means located in engagement with the work path and having means to record position related curve fitting data of the moving tracer means for each coordinate definition at said spaced point coordinate locations to thereby generate coordinate curve fitting data for each of said point coordinate locations and having means to convert said coordinate curve fitting data into a curve essentially corresponding to said curved work path, and storing said coordinate data in a tool control program memory for recreating such curve in the absence of said tracer means, said program memory including a run program means in which said tool control program memory is read and said first means is moved relative to the second means in accordance with said defined curve for subsequent working said second means along said curved path.

2. The apparatus of claim 1 including means to generate position signal means for said first and second means and wherein said program memory includes a spline function program for converting said coordinate data to the constants of a spline function connecting the series of point in a continuous definition of said curve means, and said run program including means generating a command signal in accordance with said spline function, and a closed loop position control having a first input connected to receive said command signal and a second input connected to said position signal means.

3. The apparatus of claims 1 or 2, wherein said program memory includes means to read the coordinate definition of a plurality of slope definition points adjacent each of said plurality of point coordinate locations and having a slope definition program to generate the slope definition data for each of said point coordinate locations from the corresponding slope definition locations.

4. The apparatus of claim 1, having means for controlling the speed of moving the first means along the work path at a substantially slower velocity during execution of the trace-record program than during the run program.

5. The automatic apparatus of claim 1, wherein said drive program further defines an initial start reference location and a retract location spaced from the start location and the finish locations, said drive program including a fixed program for moving of said first means from the reference location to the start location and from the finish location to the retract location and then to the reference location, said computer means having write-input means for operator definition of said reference location, said start location, said finish location and said retract location.

6. The apparatus of claim 5, wherein said fixed program defines a straight line motion of the first means to the start location and from the finish location and to the retract location and to the reference location.

7. An automatic mechanical working apparatus having a tool support means mounted for multidimensional movement within a defined work area and following a geometric complex curve in space and having means to support a work means within the apparatus with a curved work path corresponding to said geometric complex curve and said work means being adapted to be worked on by a tool means, comprising a tracer means adapted to be coupled to the tool support means and having a tracer element moveable in the same path as a tool means, a logic control means connected to said tracer means and including a programmed memory means defining a start location and a finish location of said curved work path in space within the work area of said apparatus, a position signal means coupled to said support means and generating a support position signal, said programmed memory means including a dynamic trace-record program means responsive to the output of the moving tracer means to cause said tracer means to follow said work means and responsive to the output of the tracer means to simultaneously during the movement of the tracer means generate a position control program including establishing coordinate data for a series of curve definition points along said path, said coordinate data for each definition point including a plurality of closely spaced slope definition points adjacent each curve definition point, said programmed memory means having means to convert the slope definition data to slope data of each curve definition point, and having means to connect said curve definition points based on said coordinate data and said slope data for recreating such curve in the absence of said tracer means, said programmed memory means including a run program means in which said position control program generates control signals in closed position loop system for moving said tool means in accordance with said curve for subsequent working of work means having a similar work path.

8. The apparatus of claim 7, wherein said program memory includes a spline function program for connecting the series of curve definition points in a continuous definition of said curved work path, means for generating a command signal in accordance with said run program, and said closed loop position control system having a first input connected to receive said command signal and a second input connected to said position signal means.

9. The apparatus of claim 7 wherein said tool support means includes rectilinear movement in at least two directions and angular movement in at least two directions within the defined work area, said tracer means establishing first directional signals one for each of said rectilinear movements, and means coupled to said support means to generate position related signals corresponding to each of said movements including means defining said coordinate in accordance with said directional signals and position related signals to define a series of interrelated coordinates and a continuous curve inclusive of each of said curve definition points, said run program means producing continuous analog position signals for each of said movements and thereby moving said support in accordance with said curved work path for subsequent working said work means.

10. The apparatus of claim 1, wherein said support means includes separate drives for moving the support means in three cartesian coordinates and angularly about two coordinates, and said program includes separate position command signals for each of said drives.

11. An automatic contouring apparatus having a tool support means mounted for relative multi-dimensional movement within a defined work area with respect to a work means and following a geometric curve in space and having means to support said work means within the apparatus with a curved work path corresponding to said geometric curve and said work means being adapted to be worked on by said tool means during said relative movement, comprising a tracer means coupled to the tool support means for corresponding movement, a computer means connected to said tracer means, said computer means including a program memory including a drive program for defining a start location and a finish location of a geometric curve in space within the work area of said apparatus, said program memory including a dynamic self-programming trace-record program means responsive to the output of the tracer means during said movement to cause said tracer means to follow said geometric curve and simultaneously during said relative movement to collect coordinate data at a series of spaced curve definition points on said curve including slope definition data for each curve definition point and to generate a tool control program for recreating said geometric curve in the absence of said tracer means, said program memory including a run program means in which said tool control program is read and said tool means is moved in accordance with said curve for subsequent working said work means having a similar geometric curve.

12. The apparatus of claim 11, wherein said program memory includes a maximum tracer position program for continuously monitoring the position of the transducer, said run program incorporating said maximum tracer position program and generating an alarm if the transducer position deviates by a selected value from the tool defined position of said tool control program.

13. The apparatus of claim 11, having means for controlling the speed of moving the tool means along the work path at a substantially slower velocity during execution of the trace-record program than during the run program.

14. The apparatus of claim 11 wherein said tool means is an arc welding head having means to support an electrode in arc welding spacement to said work means, said head being movable along a plurality of axes for optimum positioning of the electrode, said program means having a tool control program for each of the axis.

15. The apparatus of claim 11, wherein the movement of the tool means includes first, second and third axes which are perpendicular coordinate axes and fourth, and fifth axes for angular orientation of the tool means about two coordinate axis, said coordinate system originating at the point of contact of the tool and work means.

16. The apparatus of claim 15, wherein the tool means is driven at a preselected vector velocity and having velocity sensing means coupled to the tool means for providing velocity signals for each coordinate axis, and said trace-record program means further comprising said program memory having a first axis program including an input responsive to said preselected velocity and the velocity along a second axis to establish the velocity along said first axis, said program memory having second and third axes programs and each having an input responsive to the output of said tracer means to establish a velocity in the corresponding second and third axis, and said program memory having separate angular orientation programs for each of said angular orientations and each having an input responsive to a trig function of the preselected velocity input and the velocity along the corresponding coordinate axis.

17. The automatic contouring apparatus of claim 11, wherein said drive program further defines a reference location spaced from the start location, said drive program including a fixed reference program for moving of said tool means from the reference location to the start location and from the finish location to the reference location, said computer means having write-input means for operator definition of said reference location and said start location and said finish location.

18. The apparatus of claim 17, including a retract location intermediate said finish location and said start location, said tool means moving in a straight line motion to the start location and from the finish location to the retract location and then back to the reference location.

19. An automatic contouring apparatus having a working tool mounted for relative movement with respect to work means in a complex path having at least one portion with a progressively changing slope with movement about a plurality of different axes including one axis extended along a work path with respect to said work means and separate drive means for each of said axes and having a tracer-transducer means adapted to move along said work path and develop reference signals during said movement of the tracer-transducer means for selected axes, comprising a computer means connected to said tracer-transducer means and to said drive means, said computer means including a program memory including a reference program for defining a plurality of spaced locations in space within the work area of said apparatus, said spaced locations including initial and final reference locations for the desired tool motion, write input means for operation definition of each of said locations, said program memory including a dynamic self-programming trace-record program includes a closed loop position control responsive to the output of the transducer means during the movement of transducer means as an input signal to read the position of the tracer-transducer means and the movement of said tracer-transducer means at selected curve definition data points and reading coordinate data at each of said curve definition data points including slope definition and location data and adapted to generate a tool control program connecting said curve definition points in accordance with said slope definition and location data for closely fitting said path, and including a playback program in which said tool control program is read to develop drive signals for each of said separate drive means and to directly apply said drive signals to energize said separate drive means, and means to selectively operate the computer means in a trace-record mode with the trace-record program operative and in a playback mode with said playback program operative.

20. The apparatus of claim 19 wherein said locations include a work-start point and a work-end point and a series of spaced locations between said points, said program memory including a preset table having a presettable fixed program means to define said work-start point and said work-end point, fixed program means for moving of said tool through the series of spaced locations between said work-end point and said work-start point, said presettable fixed program means being used in both said trace-record mode and said playback mode.

21. The apparatus of claim 19 wherein said program memory includes a maximum tracer position program for continuously monitoring the position of the transducer and generating an alarm if the transducer position deviates by a selected value from the tool defined position of said self-generated control program, said tracer position program being selectively executed during the playback mode.

22. The apparatus of claim 19, having means for controlling the speed of moving the tool means along the work path at a substantially slower velocity during the trace-record mode than during the operation mode, said computer operating between said reading points to develop data for each point for fitting of said points to a curve essentially corresponding to said original contour.

23. The apparatus of claim 22 wherein each point is joined to the preceding point in accordance with a third degree polynominal spline function.

24. The apparatus of claim 19, wherein said axes include first, second and third axes which are perpendicular coordinate axes and fourth and fifth axes for angular orientation of the tool about two of said coordinate axes, a first of said coordinate axis being substantially parallel to the work path, said trace-record program having first and second axis programs for said second and third axes including an error-minimizing control means and having an input responsive to the output of said transducer means to write said tool program, said trace-record program including a first axis program having an input responsive to a desired constant velocity and the velocity along the second axis and a fourth axis program for said angular orientation having an input responsive to a trig function of the constant velocity input and the velocity along the corresponding coordinate axis.

25. The apparatus of claim 24, having means for controlling the speed of moving the tracer and tool means along the work path at a substantially slower velocity during the trace-record mode than during the playback mode.

26. The apparatus of claim 25, wherein said program memory unit includes a maximum tracer position program for continuously monitoring the position of the transducer and generating an alarm if the transducer position deviates by a selected value from the tool defined position of said control program, said tracer position program being executable during the playback mode.

27. A method controlling the relative motion of a first working means mounted for multi-dimensional movement relative to a second work means within a defined work area along a geometric curve on the work means, said curve having at least one curved portion with a progressively changing slope; said working means having a tracer means mounted for progressive and continuous movement along said curve with the working means and producing an output signal during such movement, comprising the steps relatively moving the working means relative the work means in a continuous motion through said one curved portion, controlling said relative motion in accordance with the output of the tracer means to hold the tracer means on said curved portion, and digitizing said output signals at a plurality of spaced point coordinate locations within said curved portion and as said tracer means moves through said curved portion, said output signals including location data and slope data to establish position related curve fitting data of the moving tracer means for each coordinate definition at said spaced point coordinate locations, converting said curve fitting data into a control command signal and relatively moving said working means and work means along a geometric curve in accordance with said command signals essentially corresponding to said geometric curve on the work means, and including storing said coordinate curve fitting data in a tool control logic program memory for sequentially recreating said motion along said geometric curve independently of said tracer means.

28. The method of claim 27 further converting said coordinate data to the constants of a spline function connecting said series of points in said geometric curve, and generating said command signal in accordance with said spline function.

29. The method of claim 28 including reading coordinate location definition of a plurality of slope definition points adjacent each of said plurality of point coordinate locations electronically and calculating the slope definition at each of said point coordinate locations from said corresponding location definition for the related slope definition points.

* * * * *